US 7,355,739 B2

(12) United States Patent
Irino

(10) Patent No.: US 7,355,739 B2
(45) Date of Patent: Apr. 8, 2008

(54) IMAGE FORMING DEVICE HAVING A MEMORY ASSIGNMENT UNIT

(75) Inventor: Yoshiaki Irino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 847 days.

(21) Appl. No.: 10/242,471

(22) Filed: Sep. 13, 2002

(65) Prior Publication Data

US 2003/0063316 A1 Apr. 3, 2003

(30) Foreign Application Priority Data

Sep. 14, 2001 (JP) ............................. 2001-280641
Sep. 21, 2001 (JP) ............................. 2001-290169
Sep. 10, 2002 (JP) ............................. 2002-263644
Sep. 10, 2002 (JP) ............................. 2002-263645

(51) Int. Cl.
*G06K 15/00* (2006.01)
*G06F 12/00* (2006.01)
*G06F 9/26* (2006.01)

(52) U.S. Cl. ..................... 358/1.16; 711/2; 711/203
(58) Field of Classification Search .......... 358/1.16, 358/400, 444, 404, 468, 1.17; 711/2, 6, 203, 711/15
See application file for complete search history.

(56) References Cited

U.S. PATENT DOCUMENTS

| 5,504,904 | A | * | 4/1996 | Dayan et al. .................. 713/1 |
| 5,758,183 | A | | 5/1998 | Scales |
| 5,835,765 | A | * | 11/1998 | Matsumoto .................. 718/102 |
| 6,089,772 | A | | 7/2000 | Takemura et al. |
| 6,226,095 | B1 | | 5/2001 | Fukuta |
| 6,298,404 | B1 | | 10/2001 | Mishra |
| 6,332,172 | B1 | * | 12/2001 | Iverson ..................... 710/68 |
| 6,345,350 | B2 | * | 2/2002 | Maruyama et al. .......... 711/202 |
| 6,408,313 | B1 | * | 6/2002 | Campbell et al. ............ 707/205 |
| 2002/0054316 | A1 | * | 5/2002 | Abe ............................. 358/1.14 |

FOREIGN PATENT DOCUMENTS

| EP | 0 785 482 | 7/1997 |
| JP | 9-16380 | 1/1997 |
| JP | 9-22399 | 1/1997 |
| JP | 9-52409 | 2/1997 |
| JP | 9-139784 | 5/1997 |
| JP | 11-129558 | 5/1999 |
| JP | 11-331529 | 11/1999 |
| JP | 2000-181643 | 6/2000 |
| JP | 2001-16395 | 1/2001 |
| JP | 2001-142709 | 5/2001 |
| JP | 2001-229018 | 8/2001 |

OTHER PUBLICATIONS 02256377.9, Zusammenfassung/Abrege.*
Hideyuki Kuwano, et al. New Generation Multifunction Peripheral "Hyper Papyrus"; Matsushita Technical Journal; vol. 46; No. 2; pp. 165-171; Apr. 2000 (w/English Abstract).

* cited by examiner

*Primary Examiner*—Jerome Grant, II
(74) *Attorney, Agent, or Firm*—Oblon, Spivak, McClelland, Maier & Neustadt, P.C.

(57) ABSTRACT

An image forming device includes an operating system to execute any of a plurality of programs. The image forming device comprises a rewritable memory which has a virtual memory area managed by the operating system and an image memory area used to store image data. A memory assignment unit assigns one of the virtual memory area and the image memory area of the rewritable memory for execution of a program of the plurality of programs upon starting up of the image forming device.

26 Claims, 18 Drawing Sheets

FIG.6

AREA SETTING FILE

| RAM CAPACITY (MB) | VM AREA (MB) | IM AREA (MB) |
|---|---|---|
| 32 | x1 | y1 |
| 48 | x2 | y2 |
| 64 | x3 | y3 |
| 96 | x4 | y5 |
| 128 | x5 | y6 |
| ⋮ | ⋮ | ⋮ |

FIG.7

| expand | -m | $\{\geqq\}$ | SIZE | $\{\begin{array}{c}VM\\IM\end{array}\}$ | SOURCE FILENAME |
|---|---|---|---|---|---|
| | | (MEMORY OPTION) | | (DESTINATION) | |
| execute | -f | | FILENAME | | EXE FILENAME |
| | | (FILE OPTION) | | | |

| expand | VM | Print_app | |
|---|---|---|---|
| expand | −m＞64MB | IM | fax_app |
| expand | −f file 1 | | file 2 |

FIG.11
(a) BEFORE EXECUTION
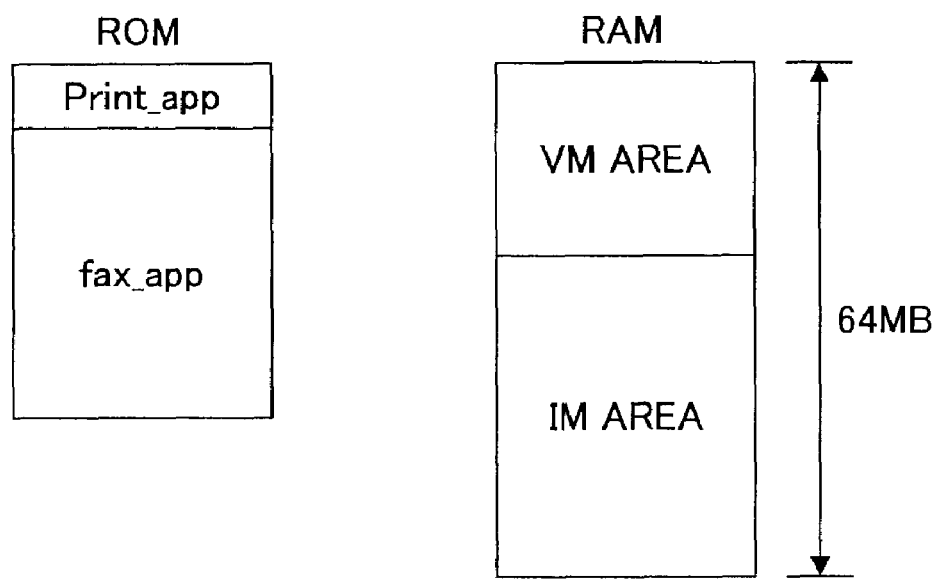
(b) AFTER EXECUTION
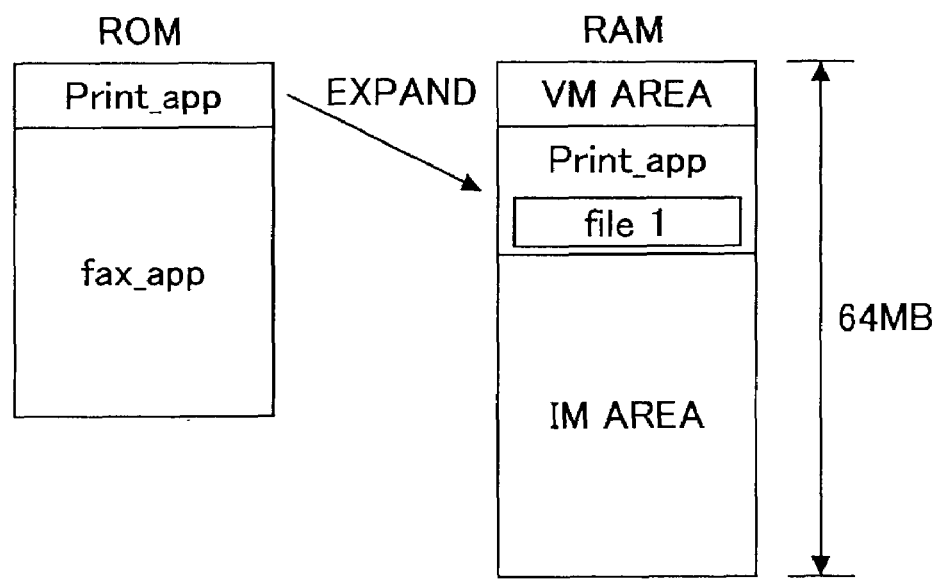

FIG.12
(a) BEFORE EXECUTION
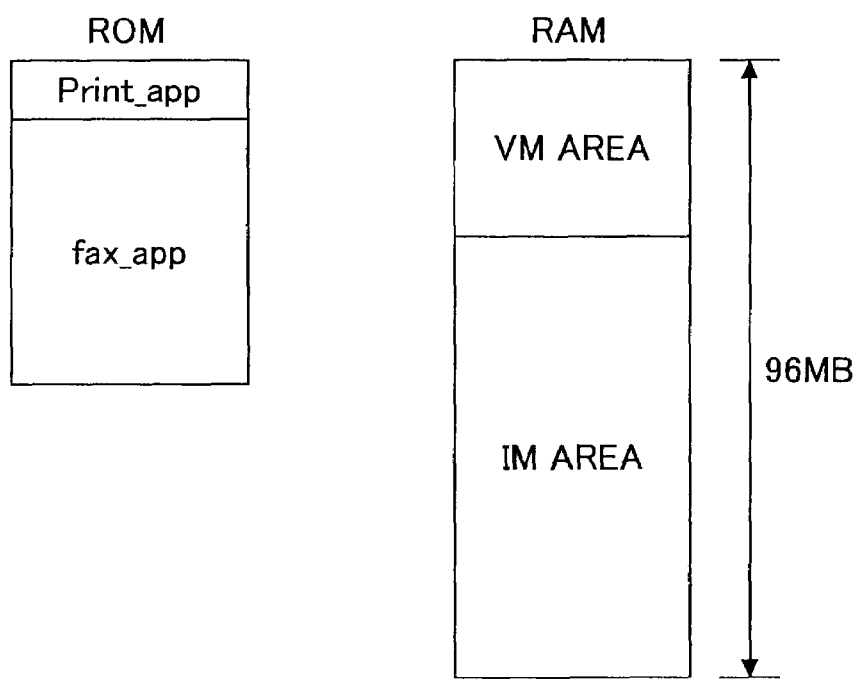
(b) AFTER EXECUTION
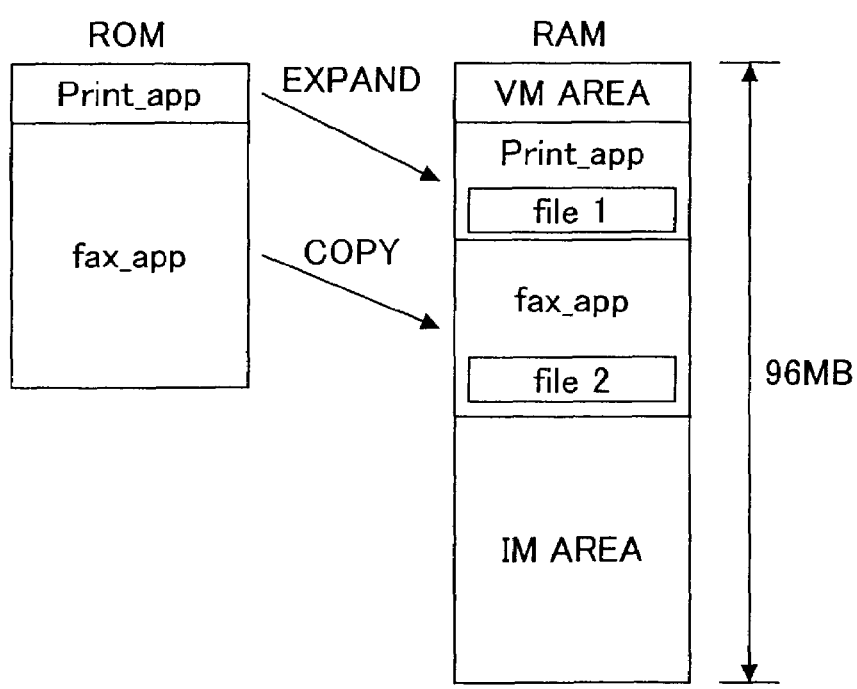

| BASIC SETTING INFORMATION | | OFFSET INFORMATION |
| --- | --- | --- |
| RAM CAPACITY (MB) | IMAGE MEMORY AREA (MB) | IMAGE MEMORY AREA INCREMENT (MB) |
| 32 | 16 | +1 |
| 48 | 32 | +2 |
| 64 | 48 | −4 |
| 96 | 64 | −4 |
| 128 | 96 | −8 |

FIG.16A

AREA SETTING FILE

| PROGRAM NAME | PRIORITY |
|---|---|
| ecs_prg (ECS) | 1 |
| mcs_prg (MCS) | 1 |
| ⋮ | ⋮ |
| fcs_prg (FCS) | 3 |
| ⋮ | ⋮ |
| copy_app | 2 |
| print_app | 2 |
| fax_app | 4 |
| scan_app | 2 |
| ⋮ | ⋮ |

FIG.16B

AREA SETTING FILE

| PROGRAM NAME | DESTINATION | PRIORITY | MUST/WANT |
|---|---|---|---|
| ecs_prg | VM | 1 | MUST |
| mcs_prg | VM | 1 | MUST |
| ⋮ | ⋮ | ⋮ | ⋮ |
| fcs_prg | PREMAP | 3 | WANT |
| ⋮ | ⋮ | ⋮ | ⋮ |
| copy_app | VM | 2 | MUST |
| print_app | VM, PREMAP | 2 | WANT |
| fax_app | VM, PREMAP | 4 | WANT |
| scan_app | PREMAP | 2 | MUST |

FIG.18
(a) BEFORE EXECUTION
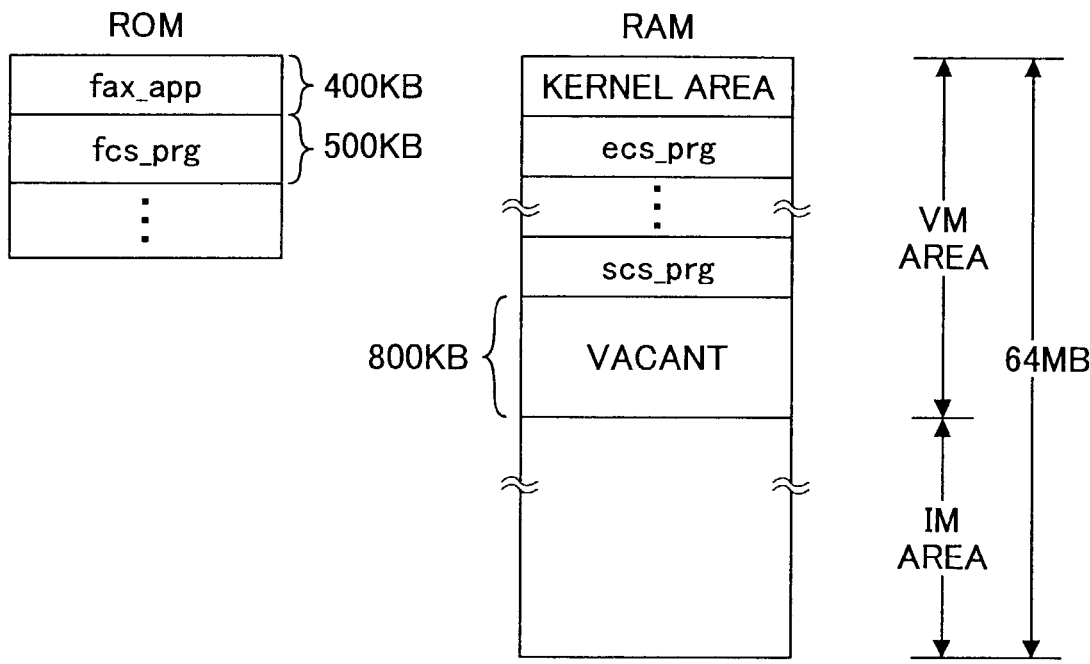
(b) AFTER EXECUTION
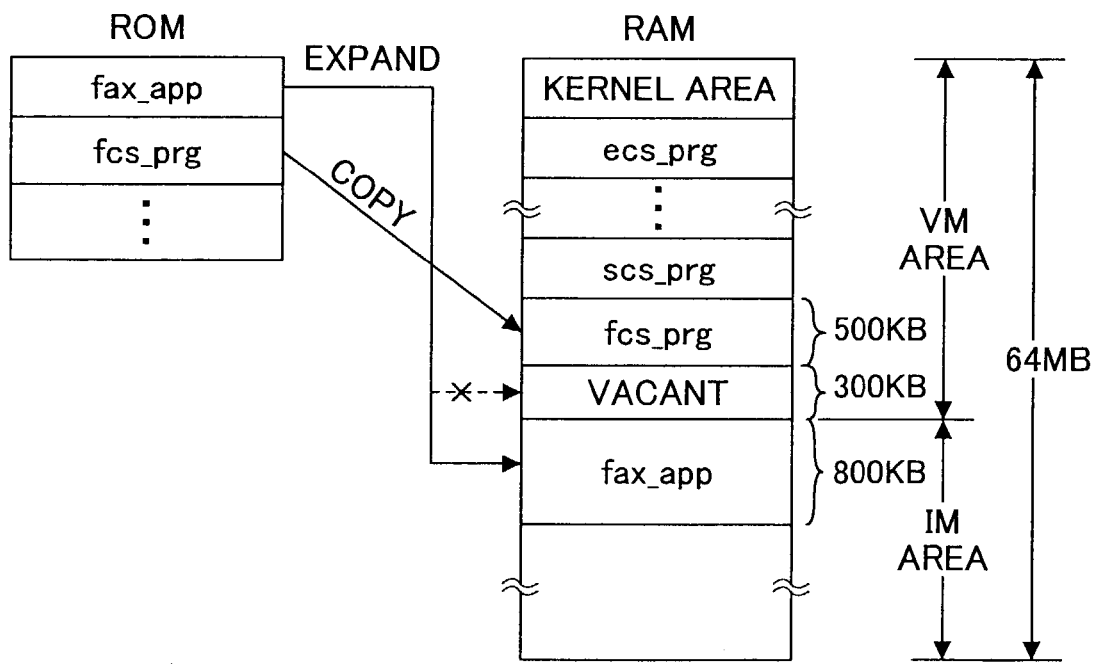

FIG.20

AREA SETTING FILE

| PROGRAM NAME | RELATED PROGRAM |
|---|---|
| ecs_prg (ECS) | ... |
| mcs_prg (MCS) | ... |
| ⋮ | ⋮ |
| fcs_prg (FCS) | ... |
| ⋮ | ⋮ |
| copy_app | ... |
| print_app | ... |
| fax_app | fcs_prg, print_sub, ... |
| scan_app | ... |
| ⋮ | ⋮ |

FIG.21
(a) BEFORE EXECUTION
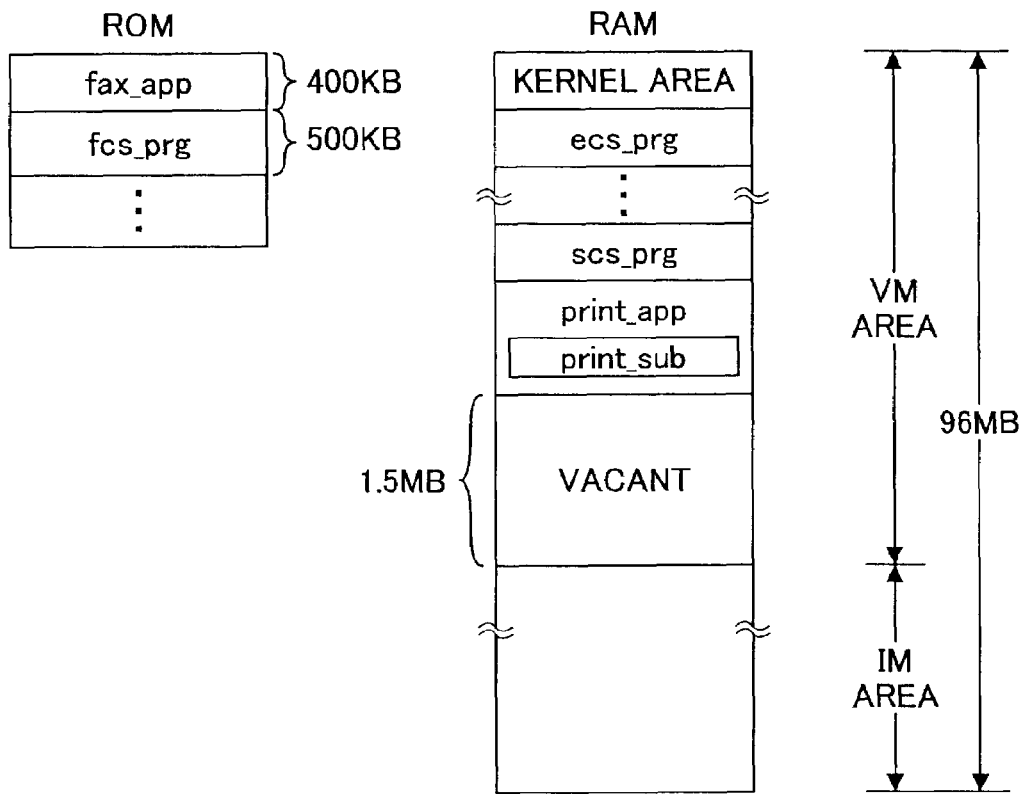
(b) AFTER EXECUTION
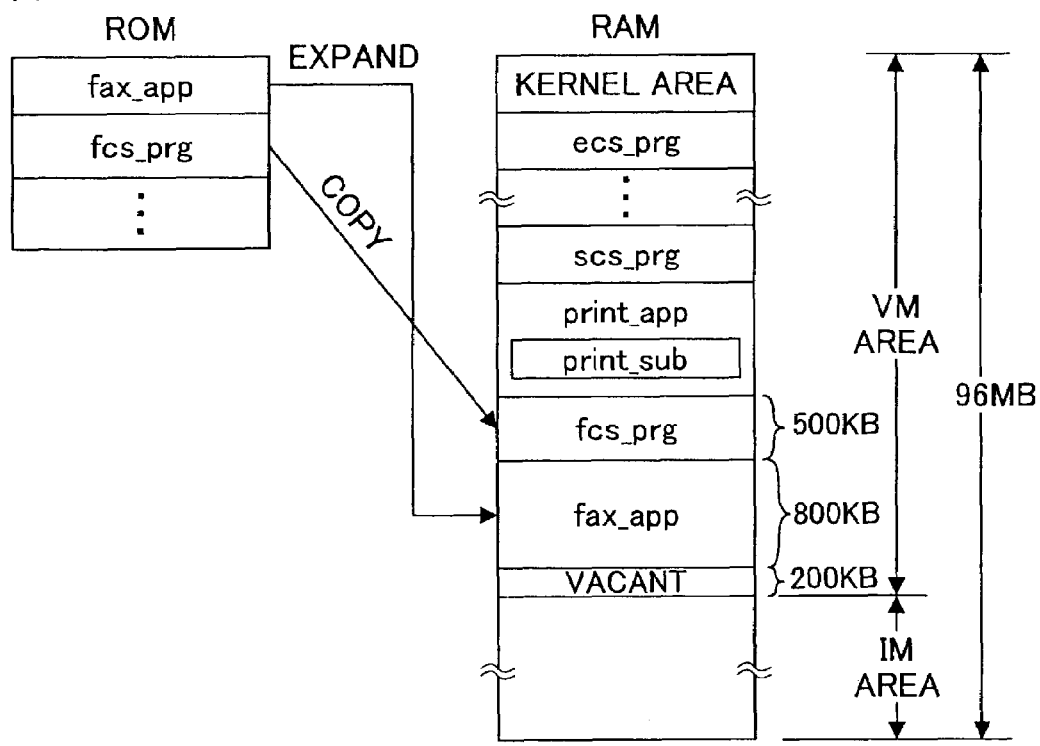

IMAGE FORMING DEVICE HAVING A MEMORY ASSIGNMENT UNIT

BACKGROUND OF THE INVENTION

1. Field of the Invention

The present invention relates to an image forming device which provides user services of the printer function, the copier function, the scanner function, the facsimile function, etc., and more particular to the memory management of such image forming device.

2. Description of the Related Art

In recent years, the image forming device in which the respective functions of the printer, the copier, the facsimile and the scanner are installed in the same equipment is known. Hereinafter, the image forming device of this type will be called a multi-function machine. The multi-function machine is provided with three kinds of software corresponding to the printer, the copier, and the facsimile, respectively, and operates the equipment concerned as the printer, the copier, the scanner, or the facsimile by changing the software from one to another. Moreover, the multi-function machine is provided with the display, the printing unit, the image reading unit, etc. that are installed in the same equipment.

The conventional multi-function machine is configured by preparing separately the programs corresponding to the printer, the copier, the scanner, and the facsimile functions, respectively. The memory areas needed by the processes created by the execution of the respective programs are assigned separately. The total size of the memory areas assigned for the respective processes becomes large according to the size of each program.

On the other hand, the memory management is performed by the operating system (OS) when the programs, such as the copy, the scanner and the printer of the multi-function machine, are running on the OS. Usually, the memory management by the OS has taken the architecture in which the memory areas are managed on the basis of one page of a fixed size in many cases.

For this reason, there is a significant difference in the size of the memory areas used according to the programs of the multi-function machine and the size of the memory areas used according to the memory management by the OS. Hence, there is the problem in that the processing speed becomes slow by the overhead in the case of the memory access due to the difference, and the memory use efficiency deteriorates.

With the conventional multi-function machine, it is configured by preparing separately the software (the general-purpose OS being included) corresponding to the printer, the copy, the scanner, and the facsimile functions of the multi-function machine, respectively, and the development of each software takes great time.

For this reason, the image forming device should have the hardware resources used by the image forming processing of the display unit, the printing unit, the image reading unit, etc. The image forming device should be provided with a plurality of applications which perform the processing respectively specific to each user service of the printer, the copy, or the facsimile. And the image forming device should have the platform which is interposed between the applications and the hardware resources, and include various control services which perform management of hardware resources needed in common by at least two applications, the execution control, and the image forming processing being offered.

When the user service is offered, it is requested that the image forming device is equipped with the above platform which includes the various control services. While attaining the increase in efficiency of the software development by considering as the composition equipped with the platform which performs the above-described functions, it becomes possible to raise the productivity as the whole equipment.

It is desirable that the above-mentioned characteristic composition can be effectively used for the memory management, because the software which is executed by the multi-function machine includes a plurality of applications and a plurality of control services.

SUMMARY OF THE INVENTION

An object of the present invention is to provide an improved image forming device in which the above-described problems are eliminated.

Another object of the present invention is to provide an image forming device which carries out the memory management that suits the architecture of the operating system and aims at improvement of the process efficiency and the memory use efficiency.

The above-mentioned objects of the present invention are achieved by an image forming device which includes an operating system to execute any of a plurality of programs, comprising: a rewritable memory which has a virtual memory area managed by the operating system and an image memory area used to store image data; and a memory assignment unit which assigns one of the virtual memory area and the image memory area of the rewritable memory for execution of a program of the plurality of programs upon starting up of the image forming device.

The above-mentioned objects of the present invention are achieved by an image forming device which includes an operating system to execute any of a plurality of programs, comprising: a read-only memory which stores the plurality of programs; a rewritable memory which has a virtual memory area managed by the operating system and an image memory area used to store image data; a memory assignment unit which assigns one of the virtual memory area and the image memory area of the rewritable memory for execution of a program of the plurality of programs upon starting up of the image forming device; and a transfer unit which transfers the program from the read-only memory to the rewritable memory before execution of the program.

The above-mentioned objects of the present invention are achieved by an image forming device which includes an operating system to execute any of a plurality of programs, comprising: a read-only memory which stores the plurality of programs; a rewritable memory which has a virtual memory area managed by the operating system and an image memory area used to store image data; a memory assignment unit which assigns one of the virtual memory area and the image memory area of the rewritable memory for execution of a program of the plurality of programs upon starting up of the image forming device; a destination determination unit which determines, in response to a starting request of the program, one of the virtual memory area and the image memory area as a destination of the program when transferred to the rewritable memory, based on setting information contained in the read-only memory; and a program starting unit which transfers the program from the read-only memory to the determined destination of the rewritable memory and starts the execution of the program on the rewritable memory.

According to the image forming device of the present invention, it is possible to carry out the memory management which suits the architecture of the operating system and aims at improvement of the process efficiency and the memory use efficiency. In the image forming device of the present invention, the virtual memory area is assigned for every process of the control services and applications and the image memory area is assigned for the image data storage on the RAM at the time of starting execution of the program. Moreover, according to the transfer conditions, the control service and the application program are copied not only to the virtual memory area but also to the image memory area.

BRIEF DESCRIPTION OF THE DRAWINGS

Other objects, features and advantages of the present invention will be apparent from the following detailed description when read in conjunction with the accompanying drawings.

FIG. 6 is a diagram showing an example of the setting of the area setting file.

FIG. 7 is a diagram for explaining the arguments of the expand command and the execute command described by the area setting file in the multi-function machine of the second preferred embodiment of the invention.

FIG. 11 is a diagram for explaining the states of the RAM before and after execution of the program transfer in which the program on the ROM is transferred to the RAM based on the information of the area setting file.

FIG. 12 is a diagram for explaining the states of the RAM before and after execution of the program transfer in which the program on the ROM is transferred to the RAM based on the information on the area setting file.

FIG. 16A and FIG. 16B are diagrams showing examples of the setting of the area setting file in the third preferred embodiment.

FIG. 18 is a diagram for explaining the states of the RAM before and after execution of the program transfer in which the program on the ROM is transferred to the RAM based on the information of the area setting file.

FIG. 20 is a diagram showing an example of the area setting file in the fourth preferred embodiment.

FIG. 21 is a diagram for explaining the states of the RAM before and after execution of the program transfer in which the program on the ROM is transferred to the RAM based on the information of the area setting file.

DETAILED DESCRIPTION OF PREFERRED EMBODIMENTS

A description will now be provided of the preferred embodiments of the present invention with reference to the accompanying drawings.

The First Preferred Embodiment

Figure 1:
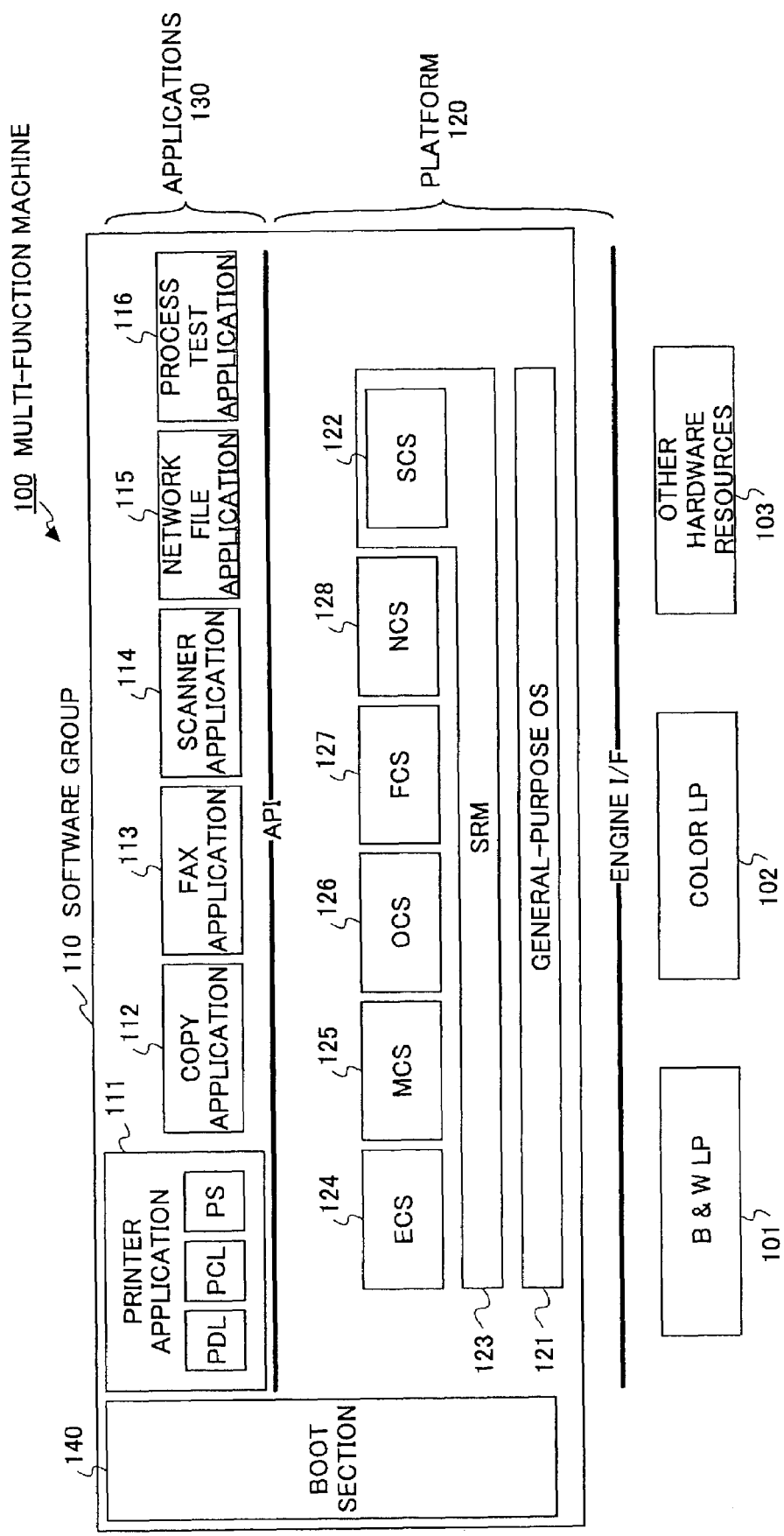
FIG. 1 is a block diagram of the multi-function machine of the first preferred embodiment of the invention.

FIG. 1 shows the composition of the image forming device (the multi-function machine) of the first preferred embodiment of the present invention.

As shown in FIG. 1, the multi-function machine 100 is provided with the software group 110. The software group 110 includes the platform 120, the applications 130 and the boot section 140. The multi-function machine 100 is further provided with the monochrome line printer (B&W LP) 101, the color line printer (COLOR LP) 102, and other hardware resources 103, such as the scanner, the facsimile, etc.

The platform 120 includes the control service in which the processing request from the application is interpreted and the acquisition request of the hardware resources is generated. Moreover, the platform 120 includes the SRM (system resource manager) 123 and the general-purpose OS 121. In the SRM 123, the management of one or a plurality of hardware resources is performed, and the acquisition requests from the control services are arbitrated.

The control service is formed by a plurality of control service modules, including the SCS (system control service) 122, the ECS (engine control service) 124, the MCS (memory control service) 125, the OCS (operation panel control service) 126, the FCS (facsimile control service) 127, and the NCS (network control service) 128.

In addition, the platform 120 has the application program interface (API) which provides the ability to receive the processing request from the applications 130 by using a pre-defined function.

The general-purpose OS 121 is the general-purpose operating system, such as UNIX, and carries out parallel execution of the respective programs of the platform 120 and the applications 130 as the processes. Each of the control services operates as the process and the parallel execution of one or a plurality of threads within the process is carried out.

The process of the SRM 123 performs control of the system and management of the resources in association with the SCS 122, arbitrates the processing requests from the high order layer using the hardware resources of the engines, such as the scanner unit and the printer unit, the memory, the HDD file, and the host I/O (the Centronics I/F, the network I/F, the IEEE-1394 I/F, the RS-232C I/F, etc.), and performs execution control.

Specifically, the SRM 123 determines whether the requested hardware resource can be used. In other words, it is determined whether the requested hardware resource is currently used by other requests. When it is determined that the requested hardware resource can be used, the SRM 123 notifies the high order layer that the use of the requested hardware resource is possible.

Moreover, the SRM 123 performs the scheduling of use of the hardware resources to the request from the high order layer, and carries out the requested operation directly. For example, the paper conveyance, the imaging operation, the memory reservation, the file generation, etc. are carried out by controlling the printer engine.

The process of the SCS 122 carries out the application management, the operation unit control, the system screen displaying, the LED (light emitting diode) displaying, the resource management, and the interrupted application control.

The process of the ECS 124 controls the engines of the hardware resource 103 including the monochrome line printer (B&W LP) 101, the color line printer (COLOR LP) 102, the scanner, the facsimile, etc.

The process of the MCS 125 performs the acquisition and releasing of the image memory, the use of the hard disk drive (HDD), and the compression and decompression of image data.

The process of the OCS 126 controls the control panel (operation panel) which is used as the communication means between the operator and the main control.

The process of the FCS 127 provides the facsimile transmission and reception using the PSTN/ISDN network from the respective application layer of the system controller, the registration/quotation of the various facsimile data managed by BKM (backup SRAM), the facsimile reading, the facsimile reception printing, and the applications for carrying out the intelligent transmission and reception.

The NCS 128 is the process for providing the services which can be used in common to the application which needs the network I/O. The process of the NCS 128 distributes the data received by each protocol from the network to each application, and provides interface at the time of transferring of the data to the network from each application.

The applications 130 are provided to perform respective processing specific to each user service of the image forming processing of the printer, the copy, the scanner or the facsimile. The applications 130 include the printer application 111 described by the PDL (page description language), the PCL or the PostScript (PS), the copy application 112, the facsimile application 113, the scanner application 114, the network file application 115, and the process test application 116.

Figure 2:
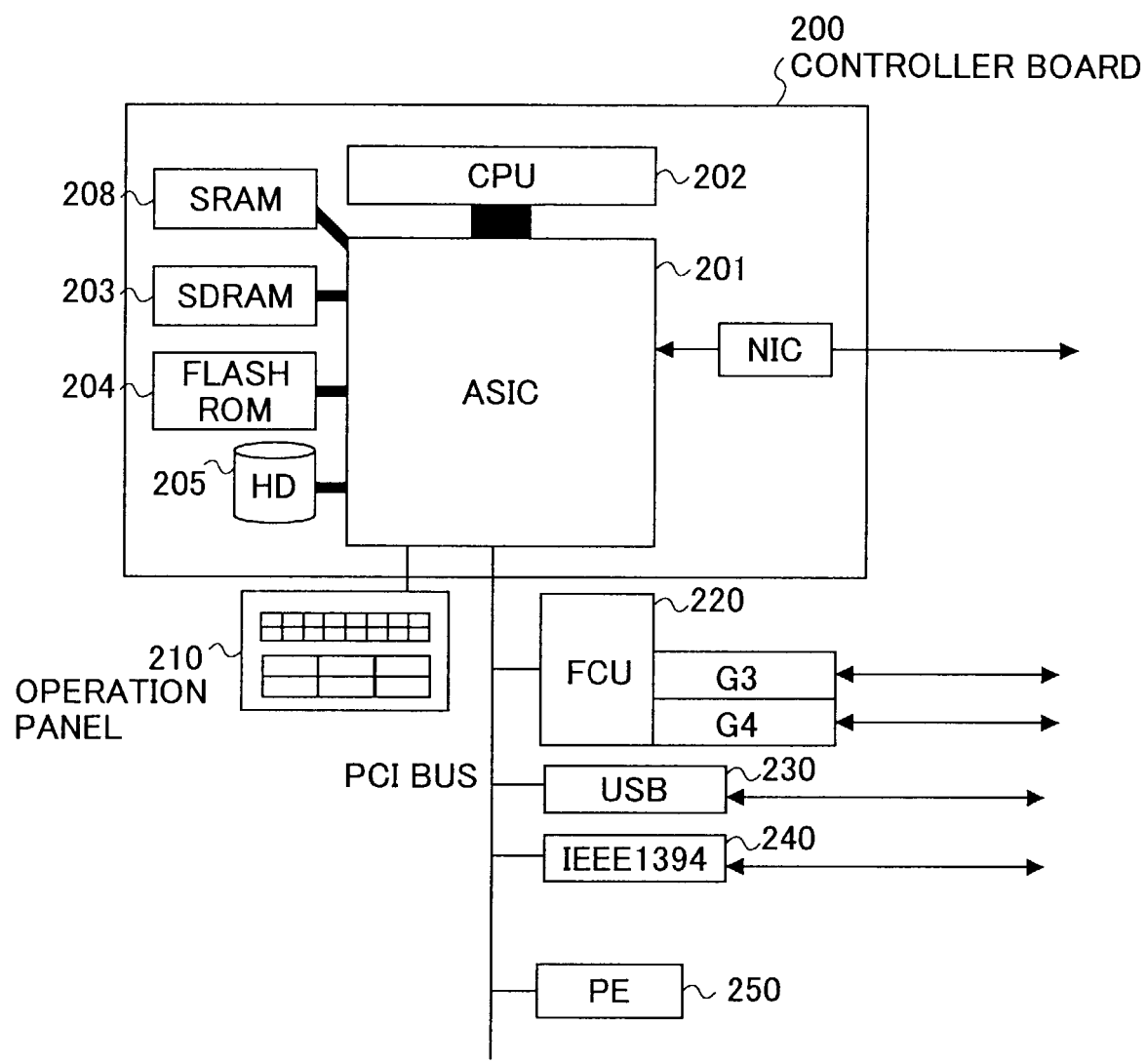
FIG. 2 is a diagram showing the hardware composition of the multi-function machine of the first preferred embodiment.

FIG. 2 shows the hardware composition of the multi-function machine of the first preferred embodiment shown in FIG. 1.

As shown in FIG. 2, the multi-function machine of the present embodiment includes the controller board 200 in which the CPU 202, the SDRAM 203, the SRAM 208, the flash ROM 204, the HD (hard disk) 205, etc. are connected to the ASIC (application-specific integrated circuit) 201. The ASIC 201 is connected to an external transmission line via an NIC (network interface card). The multi-function machine further includes the operation panel 210, the FCU (facsimile control unit) 220, the USB (universal serial bus) 230, the IEEE1394 bus 240, and the PE (printer engine) 250.

The operation panel 210 is directly connected to the ASIC 201, and the FCU 220, the USB 230, the IEEE1394 bus 240, and the PE 250 are connected to the ASIC 201 through the PCI bus. The PE 250 is connected to external printers.

The flash ROM 204 constitutes a ROM in the image forming device of the present invention. In the flash ROM 204, the above-described application programs, the control service programs of the platform 120 and the programs of the SRM 123 are stored. Moreover, in the flash ROM 204, some of the control service programs or the application programs are stored in the compressed format. In addition, in the flash ROM 204, the area setting file which will be described later is also stored.

The boot section 140 in the software group 110 of FIG. 1 is first loaded each time the power switch of the multi-function machine 100 is turned ON. The program starting section contained in the boot section 140 causes the CPU to start execution of any programs of the platform 120 and the applications 130.

Figure 3:
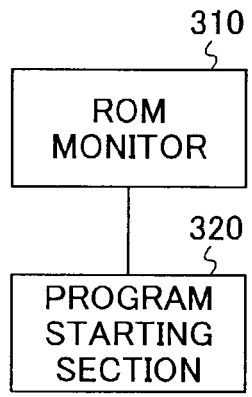
FIG. 3 is a block diagram of the boot section of the multi-function machine of the first preferred embodiment.

FIG. 3 shows the composition of the boot section 140 in the multi-function machine 100 of the first preferred embodiment.

As shown in FIG. 3, the boot section 140 includes the ROM monitor 310 and the program starting section 320. The ROM monitor 310 and the program starting section 320 are also stored in the flash ROM 204.

The ROM monitor 310 is loaded upon the starting up of the multi-function machine 100. The ROM monitor 310 performs the initialization of the hardware, the diagnosis of the controller board 200, the initialization of the software, and the starting up of the general-purpose OS 121.

The program starting section 320 is called from the OS 121. The program starting section 320 causes the CPU to assign the memory areas of the RAM 203 and transfer the control service and application programs from the flash ROM 204 to the assigned memory areas of the RAM 203. Then, the program starting section 320 causes the CPU to start execution of each program on the RAM 203.

Therefore, the program starting section 320 constitutes a memory assignment unit and a transfer unit in the image forming device of the present invention. Moreover, the RAM 203 constitutes a rewritable memory in the image forming device of the present invention.

Next, a description will be of the memory management of the multi-function machine 100 of the first preferred embodiment.

Figure 4:
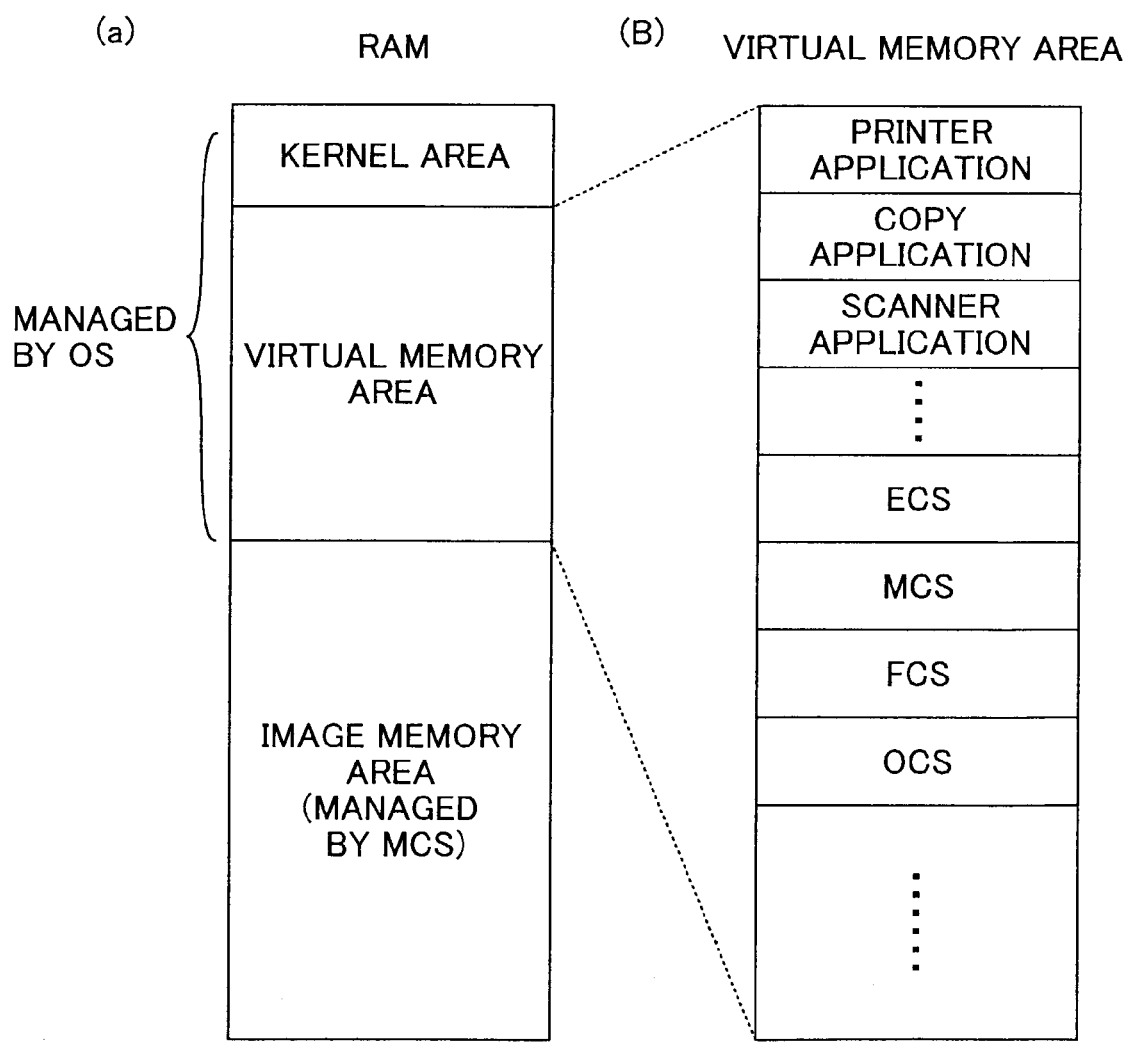
FIG. 4 is a diagram showing the memory map of the RAM and the memory map of the virtual memory area.

FIG. 4 shows the memory map of the SDRAM 203 (which is called the RAM) and the memory map of the virtual memory area. In FIG. 4, (a) indicates the memory map of the RAM, and (b) indicates the memory map of the virtual memory area.

As shown in FIG. 4, the memory areas of the RAM 203 are assigned such that they include the kernel area which is managed by the OS 121, the virtual memory (VM) area which is managed by the OS 121 and used by various application programs and various control service programs, and the image memory (IM) area which is managed by the MCS 125 and used to store the image data.

Moreover, the area setting file is stored in the flash ROM 204, and the area setting file in the present embodiment defines, in advance, the setting of a specific capacity of the virtual memory area and a specific capacity of the image memory area according to the available capacity of the RAM 203 on the multi-function machine 100.

FIG. 6 shows an example of the contents of the setting of the area setting file. In FIG. 6, x1, x2, x3, . . . , indicate specific capacities of the virtual memory area, and y1, y2, y3, . . . , indicate specific capacities of the image memory area.

Before the program starting section 320 assigns the virtual memory area and the image memory area, the program starting section 320 reads the area setting file, as shown in FIG. 6, from the flash ROM 204, and assigns each area in accordance with the setting information of the read area setting file.

In the above-mentioned example, the area setting file is stored in the flash ROM 204. However, it is not necessarily required to store the setting information of the area setting file of FIG. 6 in the flash ROM 204. For example, an additional NVRAM (nonvolatile RAM; not shown in FIG. 2) may be provided so that it is connected to the ASIC 201 of FIG. 2 and stores the setting information of the area setting file therein. Alternatively, another conceivable method is to store the setting information of the area setting file in the HD 205. The NVRAM and the HD 205 are rewritable memories.

Moreover, it is not necessarily required that the data format of the area setting information mentioned above is in the form of a file.

If the setting information of the area setting file is stored in the rewritable memory which is either the NVRAM or the HD 205 by using the above-mentioned method, it is possible to arbitrarily change the contents of the area setting information if needed.

As a method of changing the contents of the area setting information, there are various conceivable methods: manually changing the contents of the area setting information according to an input operation of the operator, automatically changing them by the multi-function machine 100, and so on.

In the case of the manual changing method, in order to change the contents of the area setting information, the operator may perform the input operation by using the operation panel 210. Alternatively, the operator may transmit new setting information to the multi-function machine 100 via the network.

In the case of the automatic changing method, the maximum capacity of the image memory area used since the time of the power switch ON of the multi-function machine 100 is recorded. And when the image memory area of the RAM becomes full and the capacity of the virtual memory area is not full, the quantity to increase the image memory area is determined.

Alternatively, two or more kinds of the area setting information are stored, in advance, and the maximum capacity of the image memory area used since the time of the power switch ON of the multi-function machine 100 is recorded. And every time the power switch of the multi-function machine 100 is turned ON, one of the kinds of the area setting information is selected to match with the maximum capacity of the image memory used at the previous time of the power switch OFF.

Figures 13, 14:
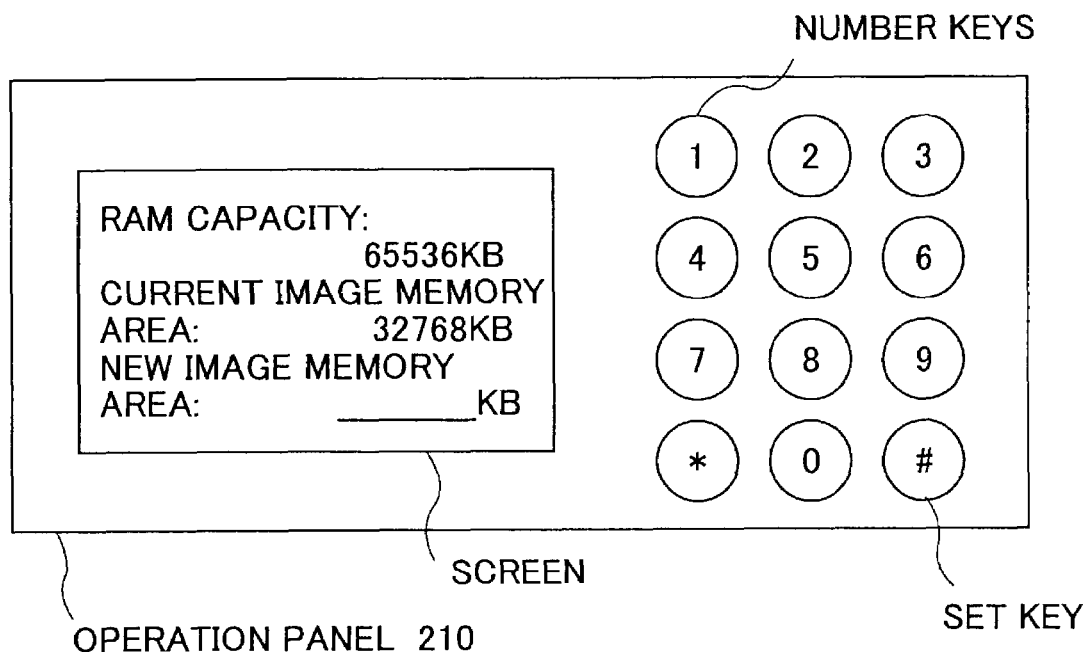
FIG. 13 is a diagram for explaining the method which sets up setting information from the operation panel.
FIG. 14 is a diagram for explaining the method which divides the area setting information into the basic setting information and the variable setting information which can be changed if needed.

FIG. 13 shows an example of the display screen on the operation panel 210 in the case where the manual changing method described above is applied.

In the example of FIG. 13, the numeric value inputted by the operator is stored as the area setting information while the current RAM capacity of the RAM 203 on the multi-function machine 100 and the current capacity of the image memory area are displayed. The operator inputs the desired capacity of the image memory area by using the number keys on the operation panel 210, and depresses the set key after the numeric value is inputted.

Alternatively, the area setting information is divided into two items of the setting information: the image memory area increment (offset information) which can be changed; and the basic setting information which is not changed. When necessary, the image memory area increment is changed and it is added to the basic setting information, so that the contents of the area setting information are changed.

FIG. 14 shows an example of the area setting information according to the above-mentioned method.

In the example of FIG. 14, the size of the virtual memory area and the size of the image memory area are determined by calculating a sum of the capacity value by the setting information of the area setting file stored in the flash ROM 204 and the capacity value by the offset information stored in the NVRAM.

The fixed numeric value according to the available capacity of the RAM 203 may be applied as the offset information stored in the NVRAM. Alternatively, a variable numeric value according to the available capacity of the RAM 203 may be applied.

On the other hand, as shown in FIG. 4(b), the virtual memory area is assigned for every process of the control services, such as the ECS 124, the MCS 125, etc., and for every process of the applications 110, such as the printer application 111, the copy application 112, etc.

Moreover, the virtual memory area is managed by the general-purpose OS 121 on the basis of pages with a predetermined size. When a new virtual memory area is needed in the process of a certain control service or application, the new virtual memory area is assigned for the process on the basis of pages. When the assigned area of the fixed size becomes unnecessary in the process, the assignment of the area is canceled from the process on the basis of pages.

In each process for which the virtual memory area is assigned, the logical address in the virtual memory area is managed separately from other processes, and each process retains a conversion table which describes the correlation between the physical address and the logical address in the virtual memory area.

Moreover, the TLB (Translation Look-aside Buffer) which is managed by the CPU 202 is provided in the cache memory of the CPU 202.

The TLB constitutes a transformation buffer in the image forming device of the present invention. The TLB retains the correlation between the logical address and the physical address which are accessed for every process. When the process specifies the logical address to access the memory, the TLB is used to transform the specified logical address into the physical address.

In the TLB, only a predetermined number (for example, 48, 64, etc.) of pairs of the logical address and the physical address can be stored.

Figure 5:
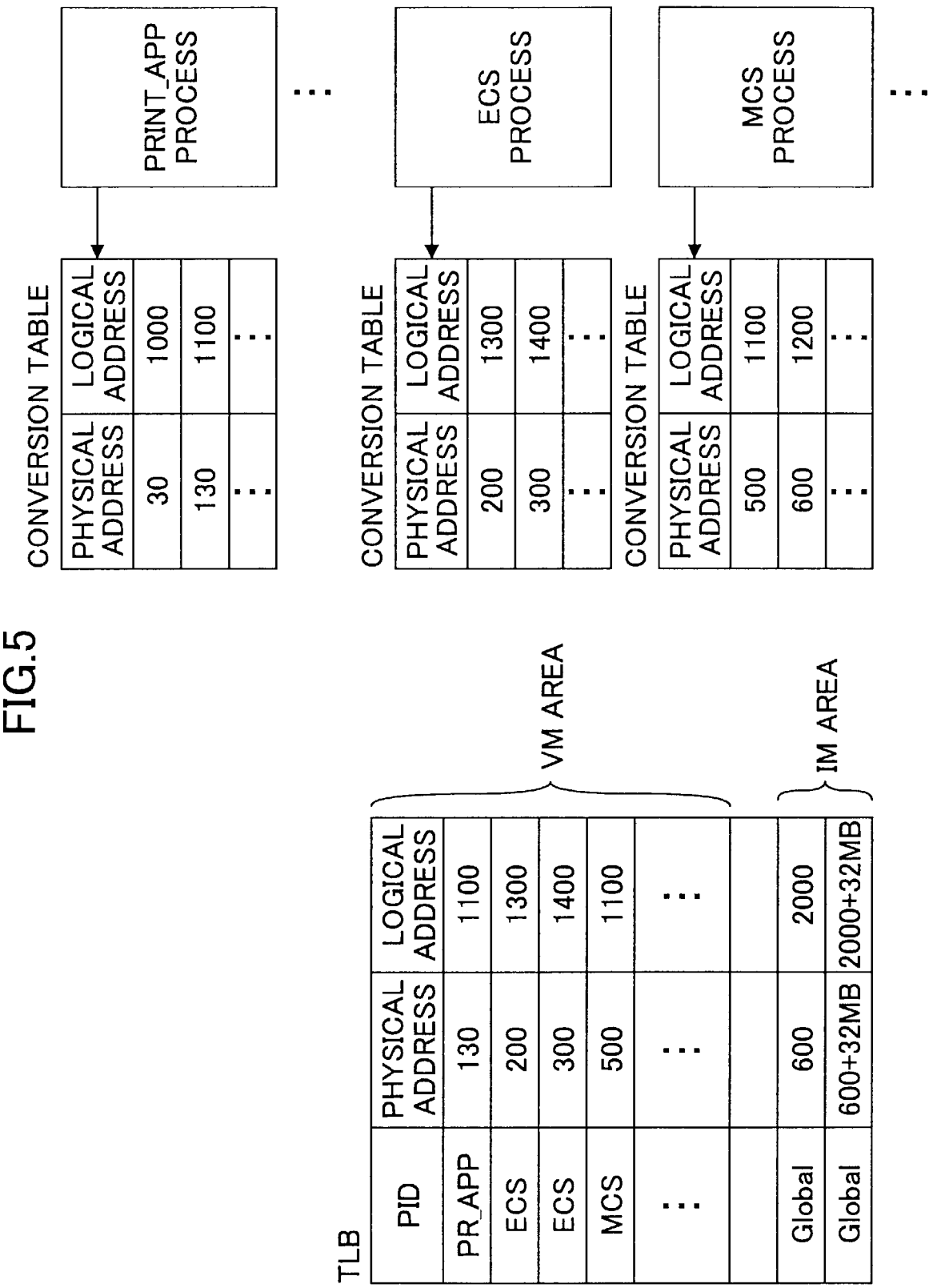
FIG. 5 is a diagram for explaining the relationship between the TLB and the conversion table of each process.

FIG. 5 shows the relationship between the TLB and the conversion table of each process.

As shown in FIG. 5, in each conversion table, the logical address specific to each of the processes is used, and the physical address which corresponds to the logical address is correlated.

On the other hand, in the TLB, the logical address of the virtual memory area which is accessed by each process, and the corresponding physical address are stored with respect to each of the processes while a specific process ID (which is called PID) is stored.

For example, when the process of the printer application 111 and the process of the MCS 125 access the same logical address (1100) of the virtual memory area, different physical addresses which are obtained through the table conversion by using the TLB are accessed.

For example, when the process of the printer application 111 accesses the logical address 1000 of the virtual memory area, the CPU searches for the logical address 1000 in the TLB by referring to the PID of the printer application 111. However, in the TLB shown in FIG. 5, there is no entry indicating the logical address 1000 for the printer application 111.

For this reason, an exception error of the TLB takes place at this time. Then the CPU accesses the conversion table of the printer application 111. The CPU obtains the physical address 30 corresponding to the logical address 1000 for the printer application 111 from the conversion table. Hence, the CPU adds to the TLB the new entry of the printer application "physical address 30, logical address 1000".

On the other hand, as for the image memory area, the logical address is being fixed to all the processes.

In the TLB shown in FIG. 5, with respect to the entry in which the PID is registered as the Global ID, the correlation between the physical address and the logical address of the image memory area is provided.

In the TLB of FIG. 5, the correlation between the logical address 2000 and the physical address 600 at the start location of the image memory area is provided, and this part of the image memory area is continuously assigned in the size (32 MB) of the memory area.

The entries for the image memory area in the TLB are not updated, which is unlike to the entries for the virtual memory area. For this reason, in all the processes, the logical address corresponding to the physical address is always fixed, and no exception error of the TLB takes place for the image memory area.

In the multi-function machine 100 of the above-described embodiment, the virtual memory area of the RAM 130 is assigned for every process of the control service programs and the application programs, and the image memory area for storing the image data is assigned further. Thus, it is possible for the present embodiment to carry out the management of the virtual memory area for every process of the control service programs and the application programs.

Accordingly, it is possible to carry out the memory management which suits the architecture of the general-purpose OS 121 that performs the memory management on the basis of pages of a comparatively small size and aims at improvement in the process efficiency and the memory use efficiency.

The Second Preferred Embodiment

The multi-function machine 100 of the first preferred embodiment assigns the virtual memory area and the image memory area on the RAM 203, and the transfer conditions that define how the control service or the application program is transferred to the virtual memory area are not especially considered. In the multi-function machine of the second preferred embodiment, the transfer conditions are specified, such as the specific capacity of the RAM or the specific location of the destination in the virtual memory area.

The composition of the multi-function machine 100 of the second preferred embodiment, the hardware composition, and the composition of the boot section 140 are essentially the same as that of the multi-function machine of the first preferred embodiment, and a description thereof will be omitted.

In the multi-function machine 100 of the second preferred embodiment, the area setting file which defines the transfer conditions and the execution conditions at the time of transferring of the related program on the flash ROM 204 to the RAM 203 is stored in the flash ROM 204.

In the area setting file, an expand command and an execute command are described. The expand command is the transfer instruction, and the execute command is the execute instruction. The transfer conditions are specified by the argument of the expand command, and the execution conditions are specified by the arguments of the execute command.

FIG. 7 shows the arguments of the expand command and the execute command described by the area setting file in the present embodiment.

As shown in FIG. 7, the memory option (-m option), the destination option (VM, IM), and the source filename are specified as the arguments of the expand command. The memory option specifies whether the file specified by the filename is transferred to the RAM 203 if the available capacity of the RAM is larger than the size specified. Or the memory option specifies whether the file specified by the filename is transferred to the RAM 203 if the available capacity of the RAM 203 is less than the size specified.

Moreover, as for the destination option, when it is desired to transfer the related program to the virtual memory area, the destination option "VM" is described. On the other hand, when it is desired to transfer the related program to the image memory area, the destination option "IM" is specified.

Moreover, the expand command causes the CPU to check the type of the source program file (specified by the source filename) on the flash ROM 204 before transferring it. When it is the compressed format, the expand command causes the CPU to expand the source program file and store the expanded program file into the RAM 203. When it is not the compressed format, the expand command causes the CPU to merely copy the source program file to the RAM 203 without expansion.

As shown in FIG. 7, the file option (-f option) and the executable program filename are specified as the arguments of the execute command.

The file option (-f option) specifies that the executable program (specified by the executable program filename) should be executed if the file specified by the filename of the file option exists on the RAM 203.

Figures 8, 9:
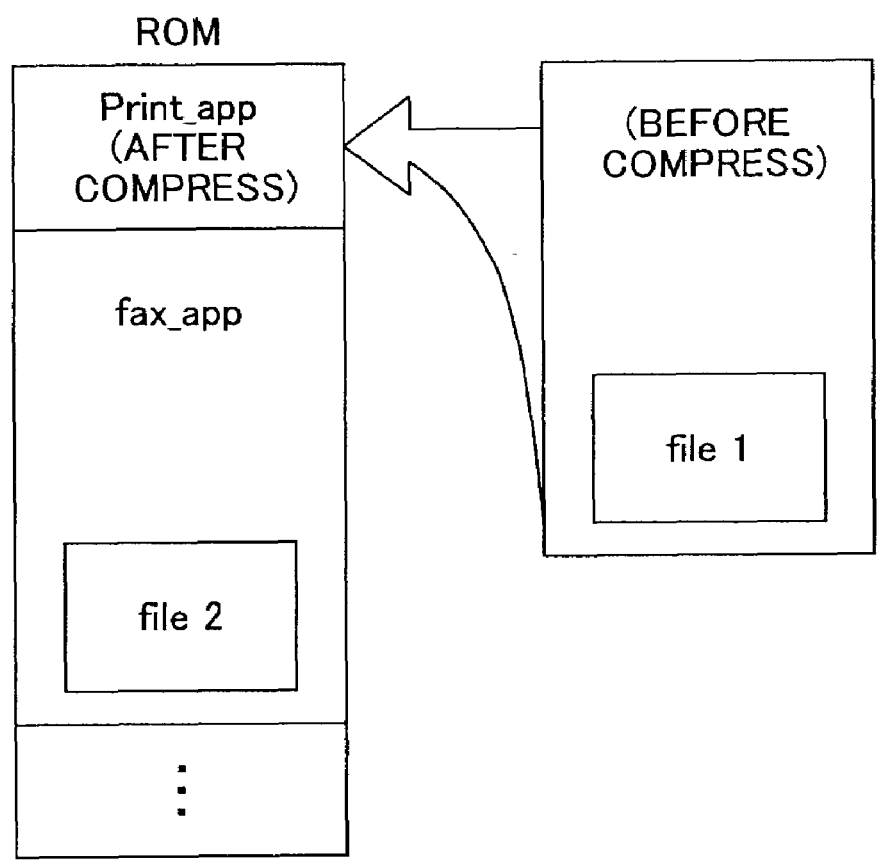
FIG. 8 is a diagram showing an example of the area setting file in the multi-function machine of the second preferred embodiment of the invention.
FIG. 9 is a diagram for explaining the arrangement of the printer application program and the fax application program on the ROM in the multi-function machine of the second preferred embodiment.

FIG. 8 shows an example of the area setting file in the present embodiment.

In the example of FIG. 8, the 1st line of the area setting file specifies that the printer application program "print_app" should be copied to or expanded and copied to the virtual memory area of the RAM.

Moreover, the 2nd line of the area setting file specifies that, when the available capacity of the RAM 203 is larger than 64 MB, the fax application program "fax_app" should be copied to the image memory area of the RAM.

Moreover, the 3rd line of the area setting file specifies that, when the file "file1" specified by the file option exists on the RAM 203, the executable program file "file2" should be executed.

FIG. 9 shows the arrangement of the printer application program and the fax application program on the flash ROM 204 in the present embodiment.

As shown in FIG. 9, the program "print_app" is in the compressed format and the program file "file1" is included in the program "print_app". The program "fax_app" is not in the compressed format, and the program file "file2" is contained in the program "fax_app".

Next, a description will be given of the transfer processing and execution of the program by the program starting section 320 in the present embodiment.

Figure 10:
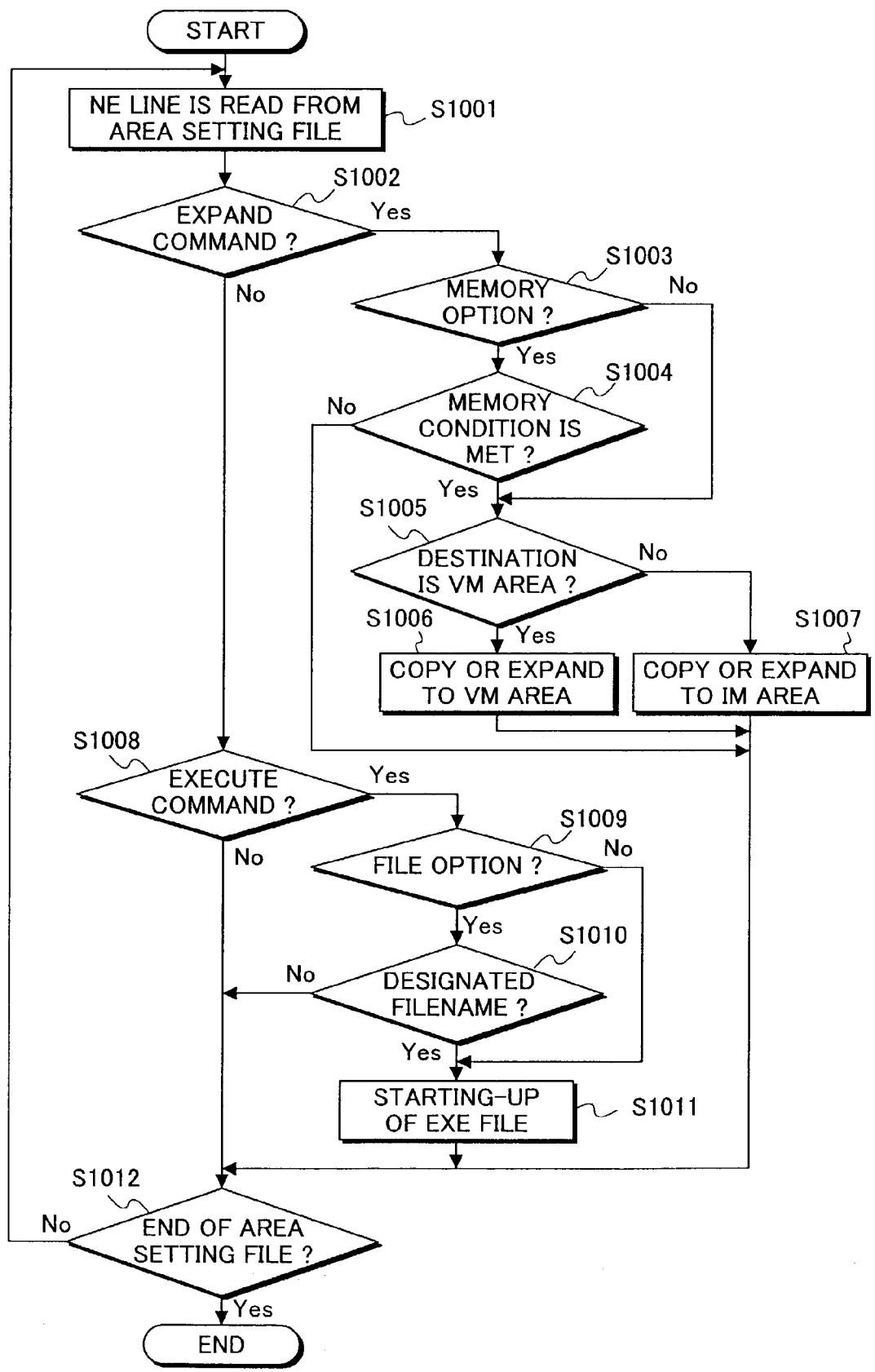
FIG. 10 is a flowchart for explaining the procedure of the program transfer processing by the program starting section of the multi-function machine of the second preferred embodiment.

FIG. 10 is a flowchart for explaining the procedure of the program transfer processing and execution by the program starting section 320 in the multi-function machine 100 of the present embodiment.

As shown in FIG. 10, at a start of the procedure, the program starting section 320 causes the CPU to read one line from the area setting file (S1001).

The CPU determines whether the command described by the read line is the expand command (S1002). When the result at the step S1002 is affirmative (the expand command), the CPU performs the following steps S1003-S1007.

The CPU determines whether the memory option (-m) is specified in the expand command (S1003).

When the result at the step S1003 is affirmative (specified), the CPU determines whether the memory condition of the available capacity of the RAM 203, specified by the memory option, is satisfied (S1004).

When the result at the step S1004 is negative (not satisfied), the control of the CPU is transferred to step S1012. The CPU will read the following line from the area setting file without performing the program transfer processing.

When it is determined at the step S1004 that the memory condition is satisfied, the CPU determines whether the destination option "VM" is specified in the expand command (S1005).

When the result at the step S1005 is affirmative (VM is specified), the CPU copies or expands the source program file to the virtual memory area of the RAM (S1006). In this case, the remaining capacity of the virtual memory area decreases.

On the other hand, when the result at the step S1005 is negative (IM is specified), the CPU copies or expands the source program file to the image memory area of the RAM (S1007). In this case, the remaining capacity of the image memory area decreases.

When the step S1006 or S1007 is performed, the CPU determines whether the end of the area setting file is detected (S1012). Initially, the result at the step S1012 is negative. The control of the CPU is transferred to the above step S1001, and the CPU will read the following line from the area setting file.

On the other hand, when the result at the step S1002 is negative (not the expand command), the CPU determines whether it is the execute command (S1008). When the result at the step S1008 is affirmative (the execute command), the CPU performs the following steps S1009-S1011.

The CPU determines whether the file option (-f) is specified in the execute command (S1009).

When the result at the step S1009 is affirmative (specified), the CPU determines whether the designated file specified by the file option exists on the RAM 203 (S1010).

When the specified file exists on the RAM 203, the CPU starts the execution of the executable program file (S1011). After the step S1011 is performed, the control of the CPU is transferred to the step S1012.

On the other hand, when the result at the step S1010 is negative (does not exist on the RAM 203), the CPU does not perform the execution of the file. The control of the CPU is transferred to the step S1012. Initially the result at the step S1012 is negative. Then, the CPU will read the next line of the area setting file.

The processing of the steps S1001 through S1011 is repeated until the last line described by the area setting file is read.

The program execution is performed on the transfer conditions in which the program on the flash ROM 204 is transferred to the RAM 203 based on the transfer conditions specified by the area setting file.

FIG. 11 shows the states of the RAM before and after the execution of the program transferring in which the program on the flash ROM 204 (FIG. 9) is transferred to the RAM 203 based on the information of the area setting file (FIG. 8) when the available capacity of the RAM 203 is 64 MB.

In FIG. 11, (a) indicates the state of the RAM before the execution of the program transferring, and (b) indicates the state of the RAM after the execution of the program transferring.

As shown in FIG. 11(b), the program "print_app" is copied to the virtual memory area of the RAM based on the information of the area setting file. The program "print_app" stored in the flash ROM 204 is in the compressed format at this time, and it is expanded and copied to the RAM 203.

The area setting file specifies that the program "fax_app" should be copied to the image memory area of the RAM only when the available capacity of the RAM is larger than 64 MB, and the program "fax_app" is not copied in the example of FIG. 11.

FIG. 12 shows the states of the RAM before and after the execution of the program transferring in which the program on the flash ROM 204 (FIG. 9) is transferred to the RAM 203 based on the information of the area setting file (FIG. 8) when the available capacity of the RAM 203 is 96 MB.

In FIG. 12, (a) indicates the state of the RAM before the execution of the program transferring, and (b) indicates the state of the RAM after the execution of the program transferring.

As shown in FIG. 12(b), the program "print_app" is expanded and copied to the virtual memory area of the RAM based on the information of the area setting file. Moreover, in this case, the available capacity of the RAM 203 is 96 MB, which is larger than 64 MB. Therefore, the program "fax_app" is copied to the image memory area of the RAM.

Thus, in the multi-function machine 100 of the second preferred embodiment, the program among the control services and the applications contained in the flash ROM 204 is transferred to the RAM 203. The ROM can be replaced by the RAM 203 having a relatively high access speed, and the execution of the control service programs and the application programs can be started from the RAM 203. Therefore, the improvement in the process efficiency can be attained.

Moreover, in the multi-function machine 100 of the second preferred embodiment, the destination to which the program of the control services or the application is transferred is determined to be the virtual memory area or the image memory area in accordance with the area setting file which describes the program transfer conditions. It is possible to transfer the program to the image memory area of the RAM 203 according to the available capacity of the RAM 203, and the memory use efficiency can be increased.

In addition, the contents of the area setting file, the commands, etc. in the second preferred embodiment are given as an example, and the present invention is not limited to this embodiment. The contents of the area setting file and the commands can be arbitrarily set up in accordance with the model of the multi-function machine.

The Third Preferred Embodiment

Next, a description will be given of the third preferred embodiment of the present invention.

The composition and the memory map of the composition of the multi-function machine 100 of the third preferred embodiment, the hardware composition, and the virtual memory area and the image memory area of the RAM 203 are essentially the same as those of the multi-function machine 100 of the first preferred embodiment, and a description thereof will be omitted.

In the present embodiment, when a request of program execution starting is received, the multi-function machine 100 transfers the program, stored in the ROM 204, to the RAM 203. In the multi-function machine 100 of the present embodiment, the program transfer processing and the starting processing are performed by the program starting mode thread of the process of the SCS 122, in parallel with the normal mode thread.

For this reason, it becomes possible to perform the program transfer processing and the program starting processing without suspending the processing at the time of providing the user services, such as the system control and resource management by the SCS 122, even when the program starting requests of the application 130 and the control service are received simultaneously.

Figure 15:
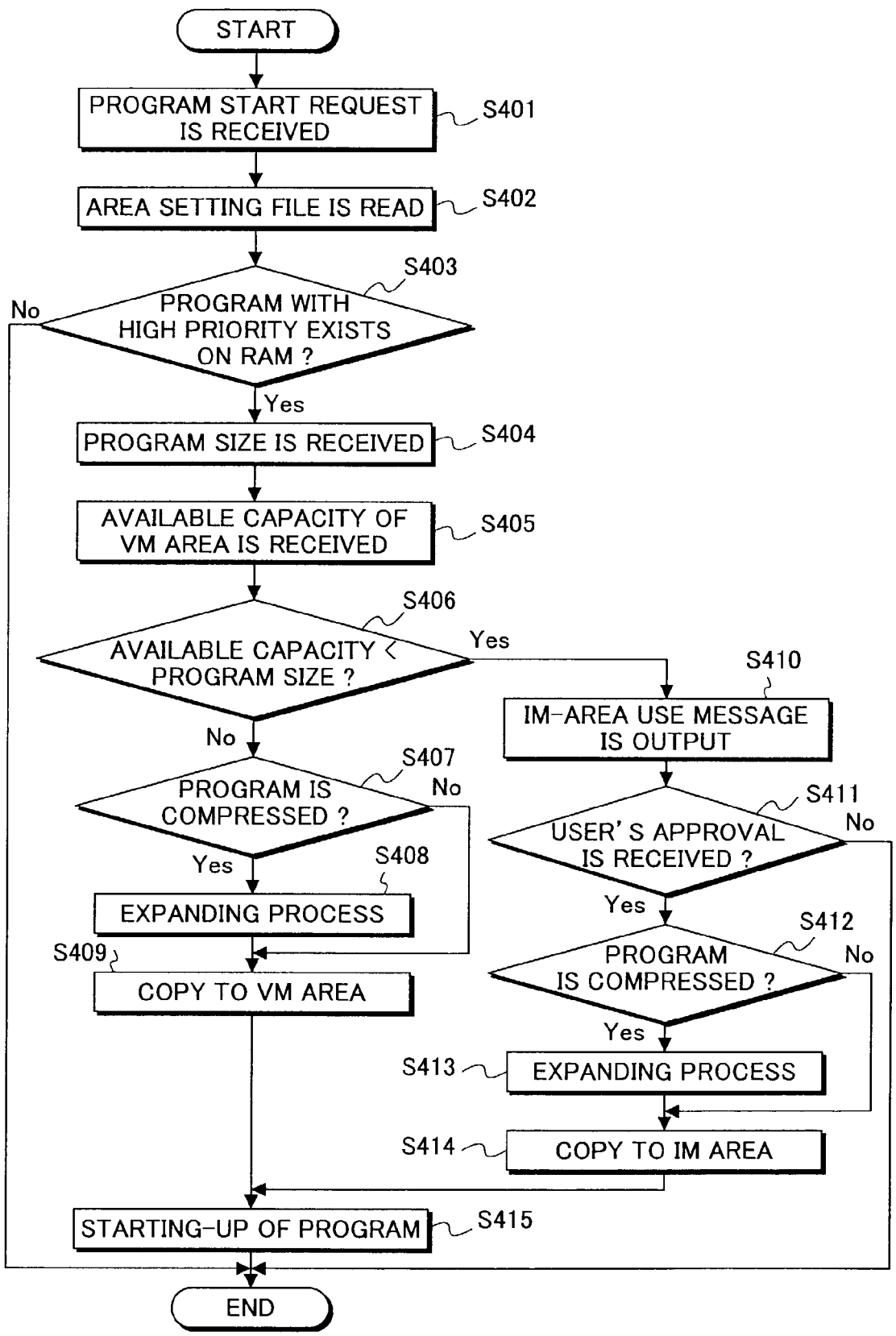
FIG. 15 is a flowchart for explaining the procedure of the program transfer processing by the program starting section of the multi-function machine of the third preferred embodiment.

FIG. 15 is a flowchart for explaining the procedure of the program transfer processing which is executed by the program starting section of the multi-function machine of the third preferred embodiment in response to the program starting mode thread of the process of the SCS 122.

During operation of the multi-function machine 100, a starting request message of a program which is not loaded to the RAM 203 is transmitted to the process of the SCS 122. This starting request message is generated as an starting request of the program applicable to the function chosen by acquiring the key event by the OCS 126, when the user chooses one of the multiple functions, such as the copy function, the printer function, and the fax function, by using the operation panel 210.

The generated starting request message is transmitted to the process of the SCS 122 by the message transmission which is the inter-process communication between the processes.

For example, when the user chooses the fax function, the starting request messages of the fax application 113 and the program of the FCS 127 are transmitted to the process of the SCS 122.

Moreover, a starting request message which is transmitted to the SCS 122 through the NCS 128 from other multi-function machines connected to the network is also contained in such starting request messages.

FIG. 16A and FIG. 16B show examples of the setting of the area setting file in the third preferred embodiment.

The program starting mode thread of the SCS 122 reads, at the time of reception of the starting request messages of the application 130 and the control service (S401), the area setting file from the ROM 204 (S402).

FIG. 16A shows an example of the area setting file used in the multi-function machine 100 of the third preferred embodiment.

As shown in FIG. 16A, the priority corresponding to the program name of the application stored in the ROM 204 and control service and each program name is described by the area setting file.

The priority information indicates the starting sequence of the program. For example, according to the area setting file shown in FIG. 16A, it is described that the execution of the ECS program (ecs_prg) of the priority 1 must be started earlier than the execution of the copy application program (copy_app) of the priority 2.

In the program starting mode thread of the SCS 122, it is determined whether an additional related program of the priority higher than the priority of the program related to the received starting request already exists on the RAM 203, by making reference to the read area setting file (S403).

When the result at the step S403 is negative (when it does not exist on the RAM 203, the program starting sequence is wrong. Hence, the program transferring and starting of the related program by the starting request are not performed, and the procedure of FIG. 15 ends.

On the other hand, when the result at the step S403 is affirmative (when it already exists on the RAM 203), the program size of the related program stored in the ROM 204 is obtained from the setting information of the area setting file (S404).

In the step S404, when the related program is stored in the ROM 204 in the compressed format, the program size after expansion is obtained from the setting information of the area setting file with respect to the program in the compressed format.

After the step S404 is performed, the available capacity of the virtual memory area of the RAM 203 is obtained (S405).

Subsequently, it is determined whether the available capacity of the virtual memory area of the RAM 203 obtained in the step S405 is less than the program size of the related program obtained in the step S404 (S406).

When the available capacity of the virtual memory area is larger than the program size as the result at the step S406, it is determined whether the related program stored in the ROM 204 is in the compressed format (S407).

When the result at the step S407 is negative (not in the compressed format), the related program is merely transferred from the ROM 204 to the virtual memory area of the RAM 203 without expansion (S409).

When the result at the step S407 is affirmative (in the compressed format), the expansion processing of the related program is performed (S408). Then, the expanded related program is transferred to the virtual memory area of the RAM 203 (S409).

After the step S409 is performed, the execution of the related program copied to the virtual memory area is started (S415).

On the other hand, when the result at the step S406 is affirmative (or when the available capacity of the virtual memory area is less than the program size), the user is notified by an image memory area use message displayed on the operation panel 210 that the image memory area of the RAM 203 is used for the program execution (S410). The multi-function machine 100 is placed in a waiting condition in which the user's approval to the displayed message is awaited (S411).

When any user's approval is not received as the result at the step S411, the procedure of FIG. 15 ends without performing the program transfer processing and starting processing.

On the other hand, when the user's approval is received as the result at the step S411, it is determined whether the related program stored in the ROM 204 is in the compressed format (S412). Similar to the above steps S407 and S408, the expansion processing of the related program is performed (S413) when the result at the step S412 is affirmative. When the result at the step S412 is negative, the expansion processing is not performed and the related program is merely transferred from the ROM 204 to the image memory area of the RAM 203 without expansion (S414).

After the step S414 is performed, the execution of the related program copied to the image memory area of the RAM 203 is started (S415).

According to the above-described procedure of FIG. 15, the programs of the application 130 and the control service with the starting request received will be transferred from the ROM 204 to the RAM 203 and the execution thereof will be started on the RAM 203 according to the priority of the related program, and the available capacity of the virtual memory area, and the process will be generated.

FIG. 16B shows other examples of the area setting file used with the multi-function machine 100 of the third preferred embodiment.

As shown in FIG. 16B, the program name of the application stored in the ROM 204 and control service, the destination of each program, the priority corresponding to each program name, and the transfer conditions (MUST/ WANT) of each program are described by the area setting file.

The destination in the area setting file of FIG. 16B indicates a specific area of the RAM 203 as a predetermined destination of the program when transferred to the RAM 203.

The transfer conditions MUST in the area setting file of FIG. 16B indicate that the related program must be transferred to the RAM 203. The transfer conditions WANT in the area setting file of FIG. 16B indicates that the related program be transferred only when the transmission to the RAM 203 is possible.

Figure 17:
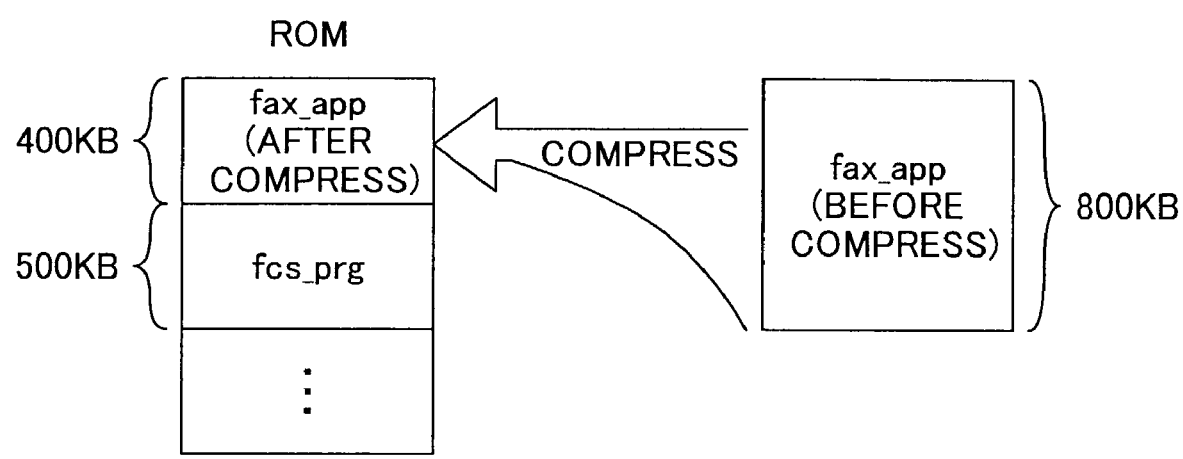
FIG. 17 is a diagram showing the arrangement of the fax application program and the FCS program in the third preferred embodiment.

FIG. 17 shows the arrangement of the fax application program and the FCS program on the ROM 204 in the third preferred embodiment. In FIG. 17, on the ROM 204 in the multi-function machine 100 of the present embodiment, the program fax_app of the fax application and the program fcs_prg of FCS 127 are stored as an example of the program files.

In the example of FIG. 17, the program fax_app is stored in the compressed format, and, the program size before compression is 800 KB (kilobyte) and the program size after compression is 400 KB.

Moreover, the program fcs_prg is stored without compression, and the program size is 500 KB.

FIG. 18 shows the states of the RAM before and after execution of the program transfer in which the program on the ROM is transferred to the RAM based on the information of the area setting file.

Specifically, FIG. 18(a) shows the state of the RAM 203 before execution of the transfer processing and starting processing of the program in the case where the total capacity of the RAM 203 is 64 MB (megabyte). FIG. 18(b) shows the state of the RAM 203 after the execution of the transfer processing and starting processing of the program on the ROM 204 (FIG. 17) to the RAM 203 based on the priority of the area setting file (FIG. 16A) and the available capacity of the virtual memory area of the RAM 203.

As shown in FIG. 18(a), before execution, the available capacity of the virtual memory area of the RAM 203 is 800 KB.

It is assumed that the starting requests of the programs of the fax application 113 and the FCS 127 are generated by the user operation. Moreover, it is assumed that, as shown in FIG. 18(a), other applications, other control services, and the SRM 123 are already loaded to the virtual memory area of the RAM 203.

In this case, the transfer processing of the program fax_app of the fax application 113 is about to be started. However, by the area setting file of FIG. 16A, the priority of the program fax_app is 4, the priority of the program fcs_prg is 3, and the priority of the program fcs_prg is higher than that of the program fax_app. At this time, the program fcs_prg is not yet loaded to the RAM 203 and it does not exist there. Therefore, the procedure of the transfer processing and starting processing of the program fax_app to the RAM 203 is performed after the procedure of the program fcs_prg is completed.

The program size of the program fcs_prg is 500 KB, and it is smaller than 800 KB of the available capacity of the virtual memory area of the RAM 203. Thus, the program fcs_prg is copied to the virtual memory area of the RAM 203 and the execution thereof is started. Thereby, the available capacity of the virtual memory area of the RAM 203 is decreased to 300 KB.

Subsequently, the transfer processing of the program fax_app is started. Since the program fcs_app is loaded to the virtual memory area of the RAM 203 and has already been executed, it is in the state in which the transferring of the program fax_app to the RAM 203 is possible.

However, the program size of the program fax_app before compression, which is 800 KB, is larger than 300 KB of the available capacity of the virtual memory area of the RAM 203 at this time, and the destination of the program fax_app is determined as the image memory area of the RAM 203 instead of the virtual memory area.

As shown in FIG. 18(b), the program fax_app is expanded, and the expanded program fax_app is copied to the image memory area of the RAM, and the execution of the program on the RAM is started after that.

Accordingly, in the multi-function machine 100 of the third preferred embodiment, when the program starting mode thread of SCS 122 receives the starting request message of the fax application and control service programs, it is determined whether the related program should be copied to the virtual memory area or the image memory area of the RAM as the destination thereof, based on the available capacity of the virtual memory area. After the related program is copied, the execution of the related program is started. Even when the available capacity of the virtual memory area of the RAM is not enough, the execution of the program can be started by using the image memory area of the RAM, and the use efficiency of the RAM 203 can be increased.

As shown in the example of FIG. 18, the program size of the fax application 113 or other application programs and the FCS 127 or other control service programs is less than 1 MB, and the size of the memory areas subjected to the memory assignment of the RAM 203 is also small. Even when the program is copied to the image memory area of the RAM, the influence over the image formation processing of the multi-function machine 100 may be negligible. For this reason, it is possible to raise the memory use efficiency without causing the problem to the user service of the image formation processing.

Moreover, the multi-function machine 100 of the third preferred embodiment, based on the priority of the program set to the area setting file, whether the application program can be transferred to the RAM 203 is determined. While the execution of the control service program has started, the execution of the application program after the program transfer processing can be started. It is possible to avoid the occurrence of an error of the program starting sequence.

In addition, in the multi-function machine 100 of the third preferred embodiment, the description of the priority information for every program may be included in the program of the SCS 122 without using the area setting file stored in the ROM 204.

Moreover, the area setting file is stored in the ROM 204 in the above-described embodiment. Alternatively, it may be stored in a rewritable storage device, such as the hard disk. In such alternative embodiment, the contents of the area setting file stored in the rewritable storage device may be rewritable arbitrarily.

Furthermore, in the multi-function machine 100 of the third preferred embodiment, the available capacity of the virtual memory area is adopted as the use situation of the RAM 203. Alternatively, based on other use situations, such as the whole capacity of the RAM 203 or the rate of the virtual memory area to the image memory area of the RAM 203, it is possible to determine the destination of the related program when transferred.

The Fourth Preferred Embodiment

Next, a description will be given of the fourth preferred embodiment of the present invention.

In the multi-function machine 100 of the third preferred embodiment, the allowability of the copying of the program to the RAM 203 is judged based on the priority information. In the present embodiment, the allowability of the copying is determined depending on whether an additional related program relevant to the program indicated by the program starting request already exists on the RAM 203.

The composition and the memory map of the composition of the multi-function machine 100 of the fourth preferred embodiment, the hardware composition, and the virtual memory area and the image memory area of the RAM 203 are essentially the same as those of the multi-function machine 100 of the first preferred embodiment, and a description thereof will be omitted.

Figure 19:
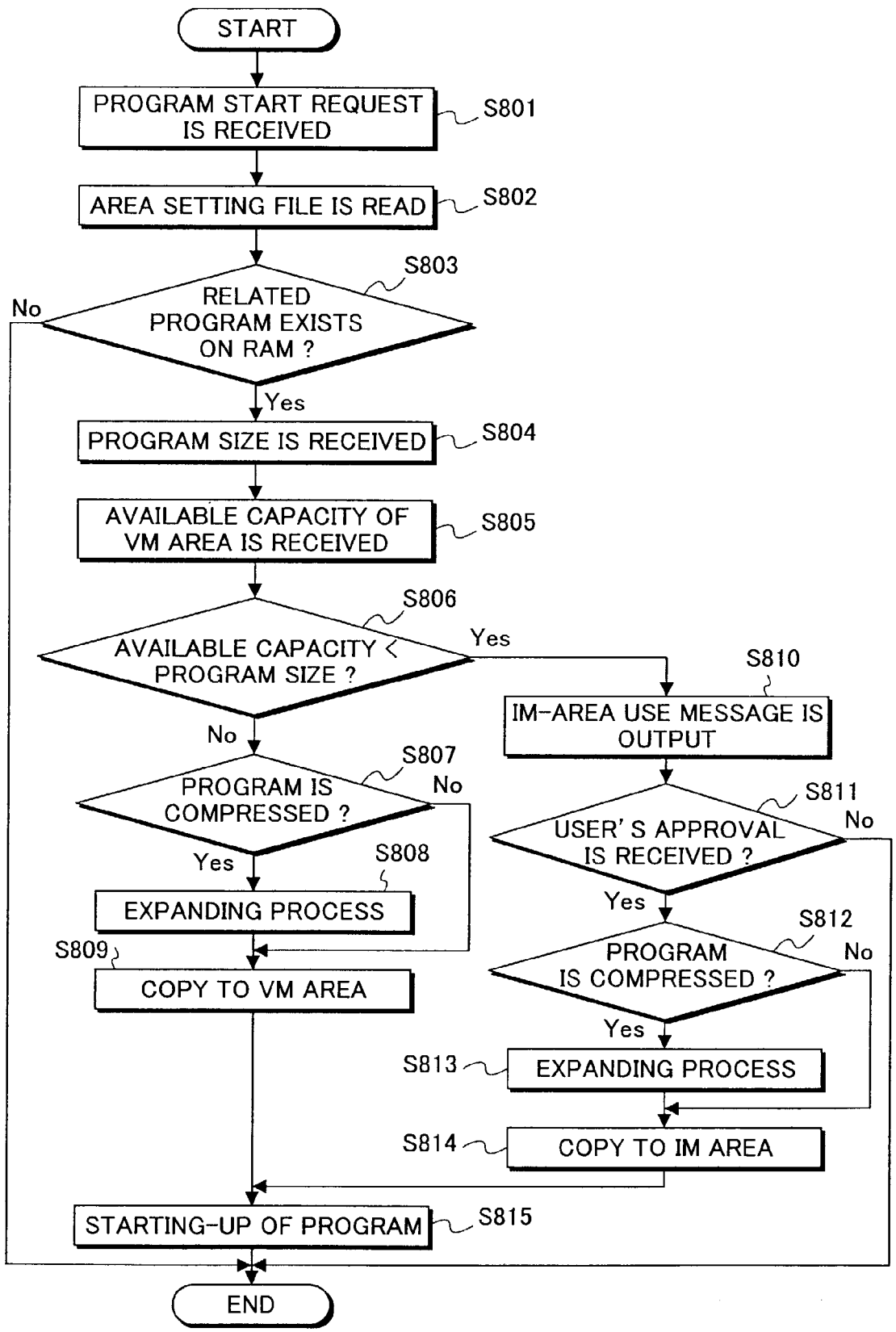
FIG. 19 is a flowchart for explaining the procedure of the program transfer processing by the program starting section of the multi-function machine of the fourth preferred embodiment.

FIG. 19 is a flowchart for explaining the procedure of the program transfer processing and starting processing which is executed by the program starting section of the multi-function machine 100 of the fourth preferred embodiment in response to the program starting mode thread of the process of the SCS 122.

As shown in FIG. 19, in the program starting mode thread of the SCS 122, the program starting request messages of the application and control service programs are received (S801). After the step S801 is performed, the area setting file stored in the ROM 204 is read out (S802).

FIG. 20 shows an example of the area setting file in the fourth preferred embodiment.

As shown in FIG. 20, the program name of the application program stored in the ROM 204 and the control service and the program name of an additional related program relevant to each program are described by the area setting file.

The additional related program indicates the program which needs to be already running at the time of the starting of the execution of the subject program.

In the example of FIG. 20, it is indicated that the execution of the fax application program "fax_app" must be started in the state where both the FCS programs "fcs_prg" and "print_sub" are already loaded to the RAM 203 and they are executed on the RAM 203.

In the program starting mode thread of the SCS 122, the program name relevant to the program with the starting request is obtained from the read area setting file, and it is determined whether the additional related program is already loaded to the RAM 203 (S803).

When not loaded yet, the starting sequence is incorrect, and the transfer processing and starting processing of the program with the starting request are not performed, and the procedure of FIG. 19 ends.

On the other hand, when already loaded to the RAM 203, the program size of the related program stored in the ROM 204 with the starting request is obtained from the information of the area setting file (S804).

When the program is stored in the ROM 204 in the compressed format, the program size after expansion is obtained from the file information of the program of the compressed format.

Regarding the transfer processing and starting processing steps S805-S815 in the present embodiment, they are essentially the same as the corresponding steps S405-S415 of FIG. 15 that are already explained with the third preferred embodiment, and a description thereof will be omitted.

FIG. 21 shows the states of the RAM before and after execution of the program transfer in which the program on the ROM is transferred to the RAM based on the information of the area setting file.

Specifically, FIG. 21(a) shows the state of the RAM 203 before execution of the transfer processing and starting processing of the program in the case where the total capacity of the RAM 203 is 96 MB. FIG. 21(b) shows the state of the RAM 203 after the execution of the transfer processing and starting processing of the program on the ROM 204 (FIG. 17) to the RAM 203 based on the additional related program of the area setting file (FIG. 20) and the available capacity of the virtual memory area of the RAM 203.

As shown in FIG. 21(a), before execution, the available capacity of the virtual memory area of the RAM 203 is 1.5 MB.

It is assumed that the starting requests of the programs of the fax application 113 and the FCS 127 are generated by the user operation. Moreover, it is assumed that, as shown in FIG. 21(a), other applications, other control services, and the SRM 123 are already loaded to the virtual memory area of the RAM 203.

In this case, the transfer processing of the program fax_app of the fax application 113 is about to be started. However, by the area setting file of FIG. 20, the programs fcs_prg and print_sub are the additional related programs of the program fax_app, and the printer application program print_sub is contained in the printer application program print_app and loaded to the RAM 203, but the fax control service program fcs_prg is not yet loaded to the RAM 203 and it does not does not exist there. Therefore, the procedure of the transfer processing and starting processing of the program fax_app to the RAM 203 is performed after the procedure of the program fcs_prg is completed.

The program size of the program fcs_prg is 500 KB, and it is smaller than 1.5 MB of the available capacity of the virtual memory area. Thus, the program fcs_prg is copied to the virtual memory area and the execution thereof is started. Thereby, the available capacity of the virtual memory area is decreased to 1 MB.

Subsequently, the transfer processing of the program fax_app is started. Since the programs print_app and fcs_app are loaded to the virtual memory area of the RAM 203 and have already been executed, it is in the state in which the transferring of the program fax_app to the RAM 203 is possible.

In this case, the program size of the program fax_app after expansion is 800 KB, and it is smaller than 1 MB of the available capacity of the virtual memory area of the RAM 203. Thus, the destination of the program fax_app when transferred to the RAM 203 is determined as being the virtual memory area.

As shown in FIG. 21(b), the program fax_app is expanded, and the expanded program fax_app is copied to the virtual memory area of the RAM 203, and the execution thereof is started after that.

Accordingly, in the multi-function machine 100 of the fourth preferred embodiment, when the additional related programs which are needed by the program starting mode thread of the SCS 122 for the execution of the related program (the control service program or the application program 130) with the starting request have already existed on the RAM 203, it is determined whether the related program should be copied to the virtual memory area or the image memory area of the RAM as the destination thereof, based on the available capacity of the virtual memory area. The additional related programs are described by the area setting file as in the example of FIG. 20. Then the related program with the starting request is copied to the RAM 203 and the execution thereof is started. It is ensured that the additional related programs needed by the program starting mode thread of the SCS 122 for the execution of the related program are already executed on the RAM 203, and it is possible to prevent the occurrence of an error of the program, execution sequence. The memory use efficiency of the RAM 203 can be increased.

In addition, in the multi-function machine 100 of the fourth preferred embodiment, the description of the additional related programs for every program may be included in the program of the SCS 122 without using the area setting file stored in the ROM 204.

Moreover, the area setting file is stored in the ROM 204 in the above-described embodiment. Alternatively, it may be stored in a rewritable storage device, such as the hard disk. In such alternative embodiment, the contents of the area setting file stored in the rewritable storage device may be rewritable arbitrarily.

Furthermore, in the multi-function machine 100 of the fourth preferred embodiment, the available capacity of the virtual memory area is adopted as the use situation of the RAM 203. Alternatively, based on other use situations, such as the whole capacity of the RAM 203 or the rate of the virtual memory area to the image memory area of the RAM 203, it is possible to determine the destination of the related program when transferred.

The Fifth Preferred Embodiment

Next, a description will be given of the fifth preferred embodiment of the present invention.

In the multi-function machine 100 of the third and fourth preferred embodiments, the program transfer processing to the RAM 203 and the program starting processing are performed according to the program starting mode thread of the SCS 122. However, in the present embodiment, the procedure of the program transfer processing and starting processing is performed according to the program starting application 117 instead of the program starting mode thread.

Figure 22:
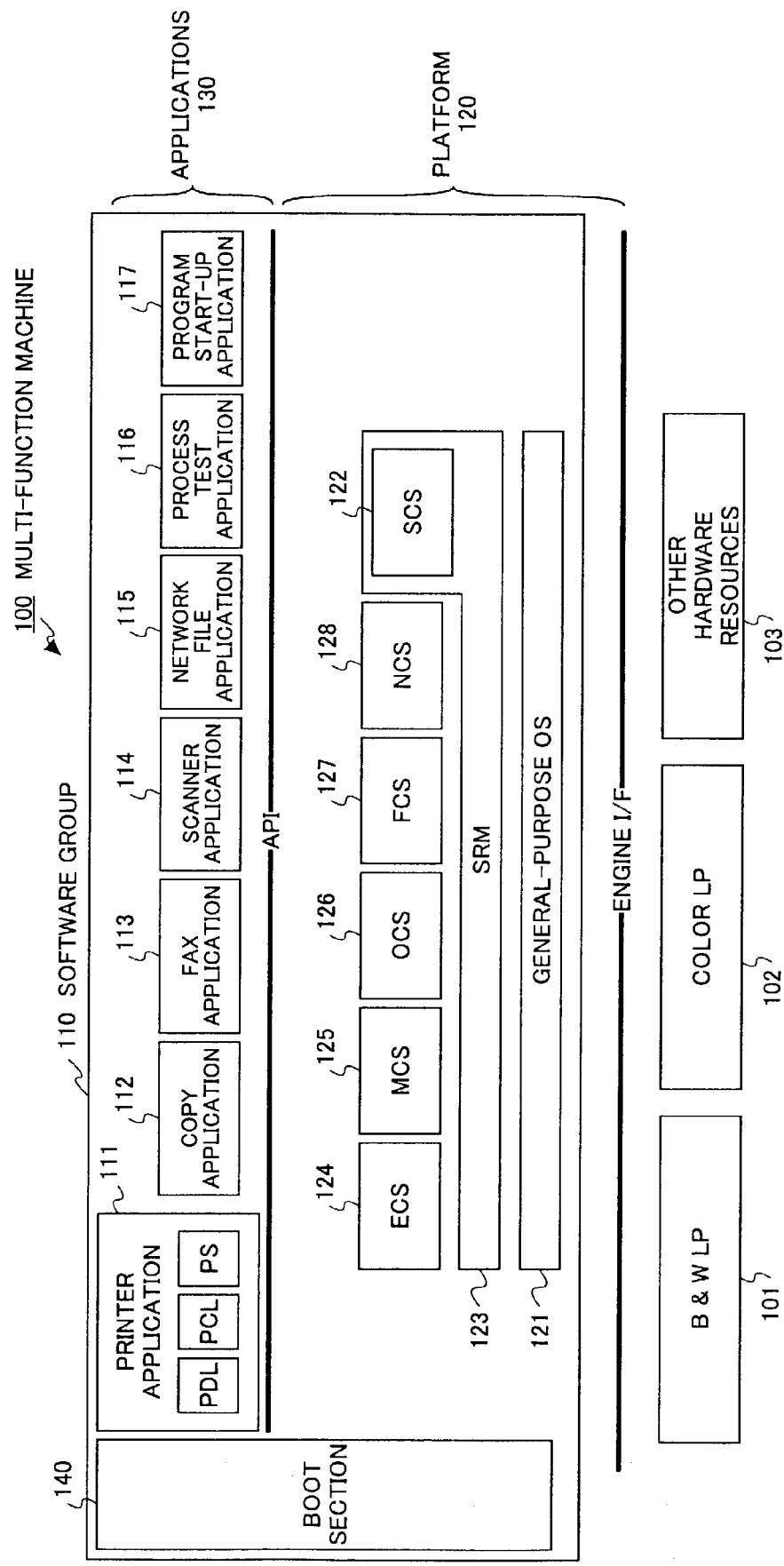
FIG. 22 is a block diagram of the multi-function machine of the fifth preferred embodiment of the invention.

FIG. 22 shows the composition of the multi-function machine of the fifth preferred embodiment of the invention.

As shown in FIG. 22, the multi-function machine 100 of the present differs from the multi-function machine of the first preferred embodiment in that it further includes the program starting application 117. Other elements of the multi-function machine 100 of the present embodiment are the same as those of the first preferred embodiment, and a description thereof will be omitted.

The program starting application 117 in the present embodiment constitutes a destination determination unit, a program starting unit, and a notification unit in the image forming device of the present invention.

The program starting application 117 operates as a process, and receives the starting request message from the application program 130 or the control service program. When this message is received, the program starting application 117 transfers the related program from the ROM 204 to the RAM 203 according to the available capacity of the virtual memory area of the RAM 203, and starts the execution of the related program on the RAM 203.

Before the transfer processing, the program starting application 117 determines whether the transferring of the related program to the RAM 203 is possible, based on the priority information of the area setting file in which the priority for every program is set.

The procedure of the transfer processing of the related program to the RAM 203 and starting processing on the RAM 203 which is performed by the program starting application 117 is essentially the same as that of the multi-function machine 100 of the third preferred embodiment, and a description thereof will be omitted.

In the multi-function machine of-the fifth preferred embodiment, the program starting application 117 is provided to perform the procedure of the transfer processing and starting processing of the related program, and starting processing—since it has the application 117. It is possible to receive the starting request from the application program or the control service program by using the application interface (API) between the application and the control service. In the conventional multi-function machine, the process to perform the program transfer processing and the starting processing is generated separately from the control service program or the application program. When compared to the conventional multi-function machine, the efforts of the software development can be reduced according to the present embodiment.

The process to perform the program transfer processing to the RAM 203 and the program starting processing is provided in the application program layer of the multi-function machine 100 of the fifth preferred embodiment, but it is possible that the process to perform the same function be provided in the control service layer separately from the SCS 122.

The present invention is not limited to the above-described embodiments, and variations and modifications may be made without departing from the scope of the present invention.

Further, the present invention is based on Japanese priority application No. 2001-280641, filed on Sep. 14, 2001, Japanese priority application No. 2001-290169, filed on Sep. 21, 2001, Japanese priority application No. 2002-263644, filed on Sep. 10, 2002, and Japanese priority application No. 2002-263645, filed on Sep. 10, 2002, the entire contents of which are hereby incorporated by reference.

What is claimed is:

1. An image forming device which includes an operating system to execute any of a plurality of programs, comprising:
    a rewritable memory having a virtual memory area managed by the operating system and an image memory area used to store image data, a capacity of the virtual memory area and the image memory area being determined by setting information; and
    a memory assignment unit assigning one of the virtual memory area or the image memory area of the rewritable memory for execution of a program of the plurality of programs upon starting up of the image forming device, based on the capacity of the virtual memory area and the image memory area determined by the setting information and a size of the program for execution,
    wherein the setting information is variable and derived from a setting file stored in a memory that stores information when power is not supplied, and
    wherein, when an available capacity of the virtual memory area of the rewritable memory is less than the size of the program for execution, the image memory area is determined as being a destination of the program when transferred to the rewritable memory.

2. The image forming device of claim 1 wherein,
    the virtual memory area of the rewritable memory is managed on the basis of pages of a predetermined size.

3. The image forming device of claim 1 wherein,
    the image forming device further comprises a transformation mechanism which correlates physical addresses of the rewritable memory with logical addresses of the virtual memory area for respective processes of the plurality of programs.

4. The image forming device of claim 3 wherein,
    the transformation mechanism includes a buffer storing correlations between physical addresses of the rewritable memory and logical addresses of the image memory area for respective processes of the plurality of programs.

5. The image forming device of claim 1 wherein,
    a physical address of the image memory area of the rewritable memory is correlated with a logical address for each of respective processes of the plurality of programs.

6. The image forming device of claim 1 wherein,
    the memory assignment unit determines both a specific capacity of the virtual memory area and a specific capacity of the image memory area in response to an available capacity of the rewritable memory, and the memory assignment unit assigns one of the virtual memory area and the image memory area for execution of the program in accordance with the determined capacities of the virtual memory area and the image memory area.

7. The image forming device of claim 1, further comprising:
    a control service which is shared by a plurality of application programs, the control service interpreting a processing request from an application program of the plurality of application programs and generating an acquisition request of hardware resources of the image forming device.

8. An image forming device which includes an operating system to execute any of a plurality of programs, comprising:
    a first memory storing the plurality of programs, the first memory storing information when power is not supplied;
    a rewritable memory having a virtual memory area managed by the operating system and an image memory area used to store image data;
    a memory assignment unit assigning one of the virtual memory area or the image memory area of the rewritable memory for execution of a program of the plurality of programs upon starting up of the image forming device based on a capacity of the virtual memory area and the image memory area and a size of the program for execution; and
    a transfer unit transferring the program from the first memory to the rewritable memory before execution of the program,
    wherein the first memory contains a setting file from which variable setting information is derived that defines a capacity of the virtual memory area and the image memory area in the rewritable memory in accordance with an available capacity of the rewritable memory, and
    wherein, when an available capacity of the virtual memory area of the rewritable memory is less than the size of the program for execution, the image memory area is determined as being a destination of the program when transferred to the rewritable memory.

9. The image forming device of claim 8 wherein,
    when the program stored in the first memory is in a compressed format, the transfer unit serves to expand the program and transfer the expanded program to the rewritable memory.

10. The image forming device of claim 8 wherein,
    the transfer unit serves to transfer the program to one of the virtual memory area and the image memory area of the rewritable memory selectively.

11. The image forming device of claim 8 wherein
    the setting information defines program transfer conditions for the program, and the transfer unit serves to select one of the virtual memory area and the image memory area as a destination of the program when transferred to the rewritable memory, based on the setting information.

12. The image forming device of claim 8 wherein
    the transfer unit serves to select one of the virtual memory area and the image memory area as a destination of the program when transferred to the rewritable memory, based on a predetermined destination of the setting information.

13. The image forming device of claim 8, further comprising:
    a control service which is shared by a plurality of application programs, the control service interpreting a processing request from an application program of the plurality of application programs and generating an acquisition request of hardware resources of the image forming device.

14. An image forming device which includes an operating system to execute any of a plurality of programs, comprising:
    a first memory storing the plurality of programs, the first memory storing information when power is not supplied;
    a rewritable memory having a virtual memory area managed by the operating system and an image memory area used to store image data;

a destination determination unit configured to determine, in response to a starting request of a program for execution, one of the virtual memory area or the image memory area as a destination of the program when transferred to the rewritable memory, based on a size of the program for execution and on a capacity of the virtual memory area and the image memory area determined by setting information; and a program starting unit transferring the program from the first memory to the determined destination of the rewritable memory and starting the execution of the program on the rewritable memory, wherein the setting information is variable and derived from a setting file stored in the first memory, and wherein, when an available capacity of the virtual memory area of the rewritable memory is less than the size of the program for execution, the image memory area is determined as being a destination of the program when transferred to the rewritable memory.

15. The image forming device of claim 14 wherein,
the image forming device further comprises a notification unit notifying a user that the destination determination unit has determined the image memory area of the rewritable memory as being the destination of the program.

16. The image forming device of claim 14 wherein,
when the program stored in the first memory is in a compressed format, the program starting unit serves to expand the program and transfer the expanded program to the rewritable memory.

17. The image forming device of claim 14 wherein,
the program starting unit serves to transfer the program to the determined destination of the rewritable memory and start the execution of the program on the rewritable memory, based on a predetermined priority of the program.

18. The image forming device of claim 17 wherein,
when a program starting request of a second program is simultaneously received and a predetermined priority of the second program is higher than the program priority of the program, the program starting unit serves to preferentially transfer the second program to the determined destination of the rewritable memory and start the execution of the second program on the rewritable memory, earlier than the transferring and starting of the program.

19. The image forming device of claim 18 wherein,
the plurality of programs stored in the first memory contain a fax application program and a fax control service program, and a predetermined priority of the fax application program is higher than a predetermined-priority of the fax control service program.

20. The image forming device of claim 14 wherein,
when an additional related program described by the starting request of the program already exists on the rewritable memory, the program starting unit serves to transfer the program from the first memory to the rewritable memory and start the execution of the program on the rewritable memory.

21. The image forming device of claim 20 wherein,
the plurality of programs stored in the first memory contain an application program and a control service program, and, when the program with the starting request is the application program, the control service program is the additional related program described by the starting request of the program.

22. The image forming device of claim 20 wherein,
the plurality of programs stored in the first memory contain a fax application program and a fax control service program, and, when the program with the starting request is the fax application program, the fax control service program is the additional related program described by the starting request of the program.

23. The image forming device of claim 14 wherein,
one of the plurality of programs stored in the first memory is a program starting application program, and the program starting application program serves as the destination determination unit and the program starting unit.

24. The image forming device of claim 14 wherein,
the plurality of programs stored in the first memory includes a system control service program which provides a system control and a resource management, and a process of the system control service program serves as the destination determination unit and the program starting unit.

25. The image forming device of claim 24 wherein,
the process of the system control service program includes a normal mode thread which is performed to provide the system control and the resource management and a program starting mode thread which is performed to serve as the destination determination unit and the program starting unit.

26. The image forming device of claim 14, further comprising:
a control service which is shared by a plurality of application programs, the control service interpreting a processing request from an application program of the plurality of application programs and generating an acquisition request of hardware resources of the image forming device.

* * * * *